United States Patent
Sharma et al.

(10) Patent No.: US 11,144,510 B2
(45) Date of Patent: Oct. 12, 2021

(54) SYSTEM AND METHOD FOR SYNCHRONIZING FILE SYSTEMS WITH LARGE NAMESPACES

(71) Applicant: Egnyte, Inc., Mountain View, CA (US)

(72) Inventors: Shishir Sharma, Mountain View, CA (US); Manish Marathe, San Jose, CA (US); Amrit Jassal, Morgan Hill, CA (US); Hakan Ancin, Los Gatos, CA (US); Dmitry Tisnek, Poznan (PL)

(73) Assignee: Egnyte, Inc., Mountain View, CA (US)

( * ) Notice: Subject to any disclaimer, the term of this patent is extended or adjusted under 35 U.S.C. 154(b) by 781 days.

(21) Appl. No.: 15/179,459

(22) Filed: Jun. 10, 2016

(65) Prior Publication Data

US 2017/0124111 A1    May 4, 2017

Related U.S. Application Data

(60) Provisional application No. 62/174,099, filed on Jun. 11, 2015.

(51) Int. Cl.
*G06F 16/178* (2019.01)

(52) U.S. Cl.
CPC ................... *G06F 16/178* (2019.01)

(58) Field of Classification Search
CPC ....................................................... G06F 16/178
(Continued)

(56) References Cited

U.S. PATENT DOCUMENTS 5,388,255 A    2/1995    Pytlik et al.
5,600,834 A    2/1997    Howard
(Continued)

FOREIGN PATENT DOCUMENTS

WO    WO 2016/014592 A1    1/2016

OTHER PUBLICATIONS

Demchenko, Yuri, et al. "On-demand provisioning of cloud and grid based infrastructure services for collaborative projects and groups." 2011 International Conference on Collaboration Technologies and Systems (CTS). IEEE, 2011. (Year: 2011).*
(Continued)

*Primary Examiner* — Mohsen Almani
(74) *Attorney, Agent, or Firm* — Larry E. Henneman, Jr.; Henneman & Associates, PLC

(57) ABSTRACT

A method for facilitating synchronization of a remote file system (RFS) and a local file system (LFS) includes maintaining a global revision identifier associated with the RFS, where the global revision identifier has a variable state, and responsive to the RFS being modified, updating metadata associated with one or more of the file system objects of the RFS based on a state of the global revision identifier. More particularly, the method includes updating the global revision identifier to a new state in response to the RFS modification and then updating the metadata of the folder(s) associated with the RFS modification. The RFS metadata is partitioned by folder and file to facilitate efficient searching based on a requested namespace view. Another method utilizes prior revision identifiers stored in the LFS to limit the RFS metadata returned to the local cloud during a rescan, by excluding the data set that has not changed, which improves the efficiency of the rescan synchronization.

27 Claims, 20 Drawing Sheets

(58) Field of Classification Search
USPC .......................................................... 707/617
See application file for complete search history.

(56) References Cited

U.S. PATENT DOCUMENTS

| | | | |
|---|---|---|---|
| 5,832,211 A * | 11/1998 | Blakley, III | G06F 21/31 726/6 |
| 6,088,706 A | 7/2000 | Hild | |
| 6,560,615 B1 | 5/2003 | Zayas et al. | |
| 6,847,984 B1 | 1/2005 | Midgley et al. | |
| 6,847,993 B1 | 1/2005 | Novaes et al. | |
| 6,925,476 B1 | 8/2005 | Multer et al. | |
| 6,952,737 B1 | 10/2005 | Coates et al. | |
| 7,085,779 B2 * | 8/2006 | Holtz | G06F 16/10 |
| 7,100,195 B1 | 8/2006 | Underwood | |
| 7,203,731 B1 | 4/2007 | Coates et al. | |
| 7,266,555 B1 | 9/2007 | Coates et al. | |
| 7,266,556 B1 | 9/2007 | Coates | |
| 7,281,168 B1 | 10/2007 | Coates et al. | |
| 7,428,540 B1 | 9/2008 | Coates et al. | |
| 7,636,743 B2 | 12/2009 | Erofeev | |
| 7,660,830 B2 | 2/2010 | Ordille | |
| 7,743,023 B2 * | 6/2010 | Teodosiu | G06F 16/184 707/612 |
| 8,311,980 B2 * | 11/2012 | Saito | G06F 16/184 707/610 |
| 8,386,424 B2 * | 2/2013 | Sharma | G06F 16/178 707/610 |
| 8,655,850 B2 | 2/2014 | Ngo et al. | |
| 8,694,564 B2 * | 4/2014 | Guarraci | G06F 16/27 707/831 |
| 9,135,269 B2 | 9/2015 | Shetty et al. | |
| 9,189,533 B2 | 11/2015 | Wautier et al. | |
| 9,424,437 B1 | 8/2016 | Ancin et al. | |
| 9,483,491 B2 | 11/2016 | Wijayaratne et al. | |
| 2001/0047400 A1 | 11/2001 | Coates et al. | |
| 2002/0184242 A1 | 12/2002 | Holtz et al. | |
| 2003/0149696 A1 | 8/2003 | Nelson et al. | |
| 2003/0153302 A1 | 8/2003 | Lewis et al. | |
| 2004/0068523 A1 | 4/2004 | Keith, Jr. et al. | |
| 2006/0004765 A1 | 1/2006 | Anderson et al. | |
| 2006/0129627 A1 | 6/2006 | Phillips et al. | |
| 2006/0155776 A1 | 7/2006 | Aust | |
| 2006/0247964 A1 | 11/2006 | Baturytski et al. | |
| 2006/0293034 A1 | 12/2006 | Armstrong | |
| 2007/0185932 A1 | 8/2007 | Teodosiu et al. | |
| 2009/0094252 A1 * | 4/2009 | Wong | H04L 67/1095 |
| 2009/0193107 A1 | 7/2009 | Srinivasan et al. | |
| 2010/0070870 A1 | 3/2010 | Halperin et al. | |
| 2010/0077026 A1 | 3/2010 | Watanabe et al. | |
| 2010/0144383 A1 | 6/2010 | Berger et al. | |
| 2010/0241668 A1 | 9/2010 | Susanto et al. | |
| 2010/0265823 A1 | 10/2010 | Zhao et al. | |
| 2011/0066668 A1 * | 3/2011 | Guarraci | G06F 16/27 707/831 |
| 2011/0099233 A1 | 4/2011 | Calder et al. | |
| 2011/0110568 A1 | 5/2011 | Vesper et al. | |
| 2011/0137991 A1 * | 6/2011 | Russell | G06Q 10/06 709/204 |
| 2011/0145363 A1 | 6/2011 | Ananthanarayanan et al. | |
| 2011/0153351 A1 | 6/2011 | Vesper et al. | |
| 2011/0218964 A1 | 9/2011 | Hagan et al. | |
| 2011/0252071 A1 | 10/2011 | Cidon | |
| 2011/0276573 A1 | 11/2011 | Wang et al. | |
| 2011/0307442 A1 * | 12/2011 | Sharma | G06F 16/172 707/611 |
| 2012/0011340 A1 | 1/2012 | Flynn et al. | |
| 2012/0070045 A1 | 3/2012 | Vesper et al. | |
| 2012/0084333 A1 * | 4/2012 | Huang | G06F 16/27 707/827 |
| 2012/0124014 A1 | 5/2012 | Provenzano | |
| 2012/0179653 A1 | 7/2012 | Araki et al. | |
| 2012/0233119 A1 | 9/2012 | Barton et al. | |
| 2013/0041918 A1 * | 2/2013 | Landais | G06F 16/178 707/769 |
| 2013/0060842 A1 | 3/2013 | Grossman | |
| 2013/0110778 A1 | 5/2013 | Taylor et al. | |
| 2013/0124638 A1 | 5/2013 | Barreto et al. | |
| 2013/0138608 A1 | 5/2013 | Smith | |
| 2013/0212067 A1 | 8/2013 | Piasecki et al. | |
| 2013/0226876 A1 | 8/2013 | Gati et al. | |
| 2013/0275973 A1 | 10/2013 | Greenfield et al. | |
| 2013/0282657 A1 | 10/2013 | Besen et al. | |
| 2013/0282785 A1 | 10/2013 | Besen et al. | |
| 2013/0282790 A1 | 10/2013 | Catmull et al. | |
| 2014/0006354 A1 * | 1/2014 | Parkison | G06F 3/0611 707/649 |
| 2014/0006465 A1 * | 1/2014 | Davis | G06F 16/183 707/827 |
| 2014/0040196 A1 * | 2/2014 | Wijayaratne | G06F 16/178 707/624 |
| 2014/0040197 A1 | 2/2014 | Wijayaratne et al. | |
| 2014/0059226 A1 | 2/2014 | Messerli et al. | |
| 2014/0149461 A1 | 5/2014 | Wijayaratne et al. | |
| 2014/0149794 A1 | 5/2014 | Shetty et al. | |
| 2014/0195485 A1 * | 7/2014 | Dorman | G06F 16/178 707/624 |
| 2014/0201139 A1 | 7/2014 | Blanding | |
| 2014/0201145 A1 | 7/2014 | Dorman et al. | |
| 2014/0250073 A1 * | 9/2014 | Zalpuri | G06F 16/178 707/636 |
| 2014/0358860 A1 | 12/2014 | Wautier et al. | |
| 2014/0372376 A1 | 12/2014 | Smith et al. | |
| 2014/0379647 A1 * | 12/2014 | Smith | G06F 16/178 707/624 |
| 2015/0052353 A1 | 2/2015 | Kang et al. | |
| 2015/0058503 A1 | 2/2015 | Deguchi | |
| 2015/0186668 A1 | 7/2015 | Whaley et al. | |
| 2015/0207844 A1 * | 7/2015 | Tataroiu | H04N 21/278 709/219 |
| 2015/0249710 A1 | 9/2015 | Stefansson et al. | |
| 2015/0326454 A1 | 11/2015 | Geis | |
| 2015/0347189 A1 | 12/2015 | Steffen et al. | |
| 2015/0347453 A1 | 12/2015 | Shetty et al. | |
| 2015/0350326 A1 | 12/2015 | Shetty et al. | |
| 2015/0370827 A1 | 12/2015 | Parkison et al. | |
| 2016/0019233 A1 | 1/2016 | Wijayaratne et al. | |
| 2016/0026815 A1 * | 1/2016 | Staley | G06F 16/3337 707/785 |
| 2016/0299917 A1 | 10/2016 | Koos et al. | |
| 2017/0041795 A1 | 2/2017 | Jassal et al. | |
| 2017/0177613 A1 | 6/2017 | Sharma et al. | |
| 2018/0018347 A1 * | 1/2018 | Yokoi | G06F 16/1827 |
| 2018/0046644 A1 | 2/2018 | Smith et al. | |
| 2018/0068112 A1 | 3/2018 | Sharma et al. | |
| 2018/0150476 A1 | 5/2018 | Koos et al. | |
| 2018/0150632 A1 | 5/2018 | Sharma et al. | |

OTHER PUBLICATIONS

FFu W, Abraham HB, Crowley P. Synchronizing namespaces with invertible bloom filters. In2015 ACM/IEEE Symposium on Architectures for Networking and Communications Systems (ANCS) May 7, 2015 (pp. 123-134). IEEE. (Year: 2015).*
WebSocket Wiki; Accessed Nov. 30, 2016.
Active Directory by Microsoft Wiki Page; Accessed Dec. 2, 2016.
Keeping an Eye on Your NTFS Drives: The Windows 2000 Change Journal Explained; MSDN; Jeffrey Cooperstein et al.; Microsoft Systems Journal, Sep. 1999; Web; May 1, 2015; https://www.microsoft.com/msj/0999/journal/journal.aspx.>.
U.S. Appl. No. 13/958,298, Office Action dated Oct. 5, 2015.
U.S. Appl. No. 13/958,298, Office Action dated May 4, 2016.
U.S. Appl. No. 13/958,298, Office Action dated Dec. 13, 2016.
U.S. Appl. No. 13/958,298, Interview Summary dated May 17, 2017.
U.S. Appl. No. 13/958,298, Notice of Allowance dated Aug. 24, 2017.
U.S. Appl. No. 13/958,435, Office Action dated May 8, 2015.
U.S. Appl. No. 13/958,435, Office Action dated Nov. 17, 2015.
U.S. Appl. No. 13/958,435, Office Action dated May 5, 2016.
U.S. Appl. No. 13/958,435, Office Action dated Nov. 22, 2016.

(56) References Cited

OTHER PUBLICATIONS

U.S. Appl. No. 13/958,435, NOA dated Sep. 18, 2017.
U.S. Appl. No. 14/805,226, Office Action dated Aug. 29, 2017.
U.S. Appl. No. 14/805,226, Office Action dated Mar. 8, 2018.
PCT Application Serial No. PCT/US15/41412 International Search Report & Written Opinion dated Dec. 11, 2015.
PCT Application Serial No. PCT/US15/41412 International Preliminary Report on Patentability dated Feb. 2, 2017.
*Benchmarking Cloud Storage Systems*, Xing Wang, Norwegian University of Science and Technology, Department of Telematics, Jul. 2014, all pages.
*MetaSync: File Synchronization Across Multiple Untrusted Storage Services*, Shen et al., University of Washington, Georgia Institute of Technology, May 2014, all pages.
*ViewBox: Integrating Local File Systems with Cloud Storage Services*, Zhang et al., $12^{th}$ USENIX Conference on File and Storage Technologies (FAST '14), Feb. 2014, all pages.
U.S. Appl. No. 14/805,226, Office Action dated Dec. 14, 2018.
U.S. Appl. No. 15/093,909, Office Action dated Jun. 27, 2018.
U.S. Appl. No. 14/805,226, Notice of Allowance dated Apr. 9, 2019.
U.S. Appl. No. 15/093,909, Office Action dated Mar. 5, 2019.
U.S. Appl. No. 15/388,038, Office Action (Restriction Requirement) dated Apr. 17, 2019.
U.S. Appl. No. 15/388,038, Office Action dated Jul. 18, 2019.
U.S. Appl. No. 15/808,425, Office Action dated Jan. 28, 2020.

\* cited by examiner

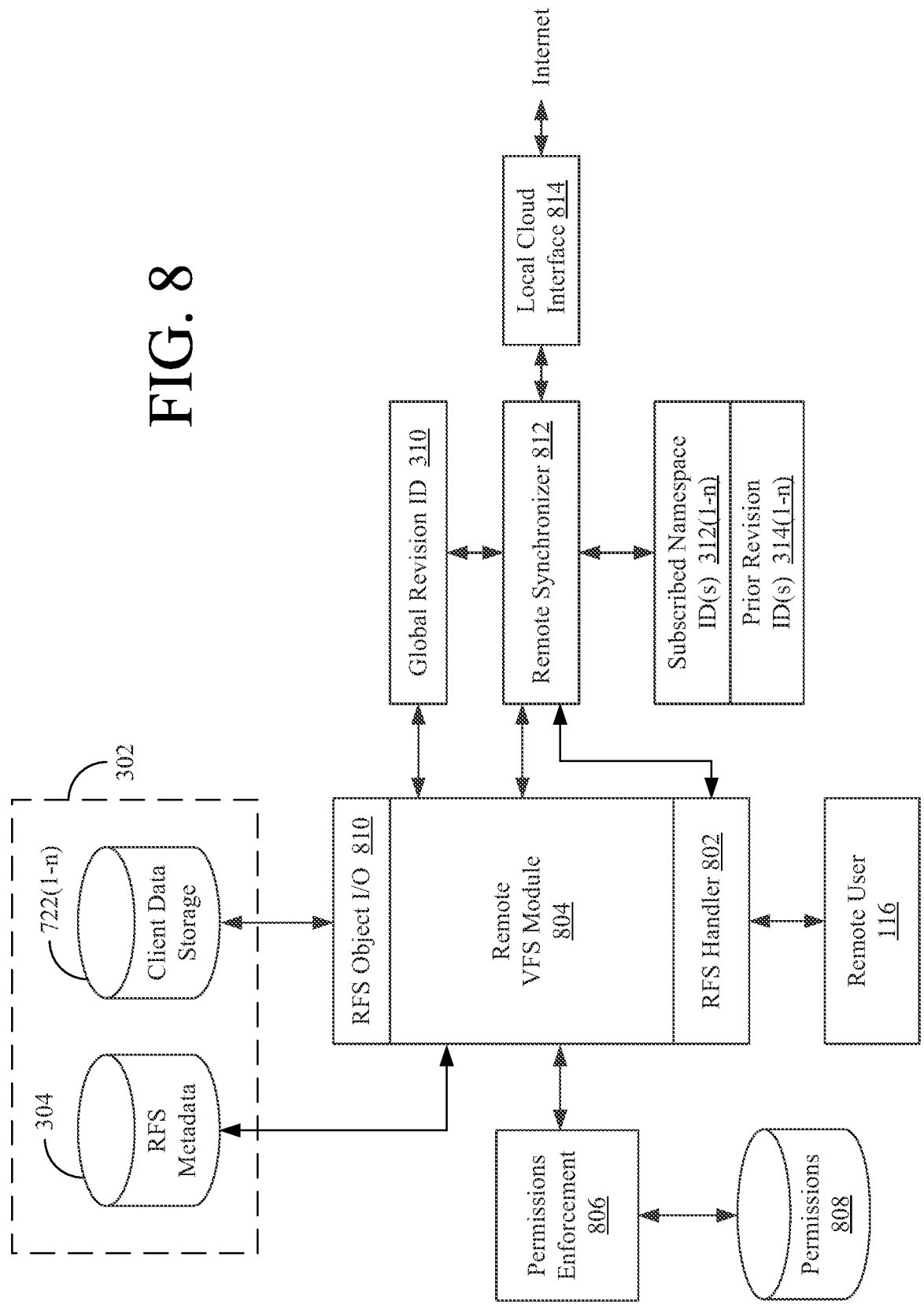

| | |
|---|---|
| Add File | Update revision ID of folder in which file was created |
| Add Folder | Update current folder's revision ID. |
| Copy File | Update revision ID of the folder containing the target file location. |
| Copy Folder | Update the revision IDs of the target folder hierarchy including the topmost target folder. |
| File Metadata Update | Update revision ID of folder containing file. |
| Move File | Update revision IDs of source and target folders. |
| Move Folder | Update revision IDs of target folder hierarchy including the topmost target folder. |
| Remove File | Update revision ID of folder containing deleted file |
| Remove Folder | No action. |
| Restore From Trash | Update revision ID(s) of target folder hierarchy for folder restore. Update revision ID of folder containing the restored or reverted file. |

FIG. 9

Requested Namespace View 315:

| 312(1): .../chicago_domain/ | 314(1): Prior_Revision_ID 524 = 357899 |

Current State of Global Revision ID 310 : 589638

| Ltd. RFS SS 330 | LVS Database 328 | LFS Snapshot 322 | Remote RS Event | File System Ops. |
|---|---|---|---|---|
| /chicago_domain/ (Rev. ID = 357899) | /chicago_domain/ | /chicago_domain/ (Pr. Rev. = 357899) | None | None |
| .../accounting/ (Rev. ID = 495632) | .../accounting/ | .../accounting/ (Pr. Rev. = 396658) | RFS metadata for folder updated | Update LFS metadata for folder |
| None | .../../ap/ | .../../ap/ (Pr. Rev. = 357899) | Folder deleted in RFS | Delete Folder in LFS |
| .../../billing/ (Rev. ID = 555422) | | | Folder created in RFS | Create folder in LFS |
| .../us_teams/ (Rev. ID = 512375) | .../us_teams/ | .../us_teams/ (Pr. Rev. = 512375) | None | None |
| .../revenue.xlsx | | | File created in RFS | Create file in LFS |
| ... | ... | ... | ... | ... |

FIG. 12A

SYSTEM AND METHOD FOR SYNCHRONIZING FILE SYSTEMS WITH LARGE NAMESPACES

CROSS-REFERENCE TO RELATED APPLICATIONS

This application claims the benefit of U.S. Provisional Patent Application Ser. No. 62/174,099, filed on Jun. 11, 2015 by at least one common inventor and entitled "System and Method for Synchronizing File Systems with Large Namespaces", which is incorporated by reference herein in its entirety.

BACKGROUND OF THE INVENTION

Field of the Invention

This invention relates generally to computer systems, and more particularly to cloud file storage systems. Even more particularly, this invention relates to synchronizing a remote file system and a local file system having a large synchronized namespace.

Description of the Background Art

Cloud computing systems are known. In cloud computing systems, computing and storage services are provided to remote clients over a wide area network such as the Internet. In the case of storage, the client's file system will exist both in the client's local storage device (e.g., a hard drive, network attached storage (NAS) device, etc.) and in the cloud. For example, the client might store a backup copy of its local file system in the cloud for both data protection and remote access. However, these benefits are negated as the remote (cloud) file system becomes out of date as more and more changes are made to the local file system and/or the remote file system.

The client's local and remote file systems can be resynchronized. Rescan synchronization is one method that can be used to resynchronize the remote and local file systems. In a rescan synchronization, the namespaces of the local file system and the remote file system are compared on an object-by-object basis to identify differences between the local and remote file systems, and then file system operations are applied to the local and remote file systems to bring them back into synchronization. A full rescan synchronization (FRS) is used to resynchronize the entire synchronized file system, whereas a limited rescan synchronization (LRS) is used to resynchronize a smaller portion of the synchronized file system. Because FRS and LRS operate similarly, just on different amounts of the synchronized file system, they can be referred to generally as a rescan synchronization (RS).

Rescan synchronizations, however, suffer from serious drawbacks. First, rescan synchronizations are very memory intensive, especially for file systems with extremely large namespaces. For example, a metadata snapshot of the entire synchronized file system can be extremely large, and this snapshot will need to be communicated from the cloud to the client's local device, or vice-versa. For a synchronized file system containing hundreds of millions of objects, this file transfer will use a large amount of communication bandwidth (e.g., over the Internet). Even a snapshot associated with an LRS on a large namespace can be very bandwidth intensive. Additionally, the actual object-by-object comparison between the remote and local file systems needs to occur, and is again is very time consuming and processor intensive. Moreover, oftentimes the majority of the file system objects that have been synchronized have not changed on either file system since the last synchronization, and so system resources spent to perform the object-by-object comparison on the unchanged items is wasted. The above limitations become even more problematic if portions of the remote and/or local file systems are unavailable during the rescan synchronization. The above limitations also make it difficult for the cloud to serve multiple customers and their client devices efficiently.

What is needed, therefore, is a system and method that facilitates efficiently resynchronizing a client's remote and local file systems, even where the client's remote file system is very large. What is also needed is a system and method for resynchronizing remote and local file systems that is more scalable so as to serve multiple clients having different sizes of synchronized file systems.

SUMMARY

The present invention overcomes the problems associated with the prior art by providing a system and method for facilitating efficient rescan synchronizations between a remote cloud server and a local cloud server. In particular, the invention optimizes the metadata transfer and comparison processes that are part of the rescan by limiting the remote dataset that needs to be transferred to the local cloud to the dataset that may have actually changed since the last synchronization. Additionally, metadata associated with the remote file system is partitioned by folders and files for efficient searching. The invention maintains a global revision identifier having a variable state and associates revision data with at least some of the remote file system's metadata. Remote file system objects that may have changed can then be quickly identified by examining the revision data stored in the metadata. Portions of the synchronized namespace that have not changed can then be excluded based on the revision data and not transferred to the local cloud for comparison. Therefore, rescan synchronizations according to the invention are more efficient and easier on system resources.

In a remote file storage system, a method for facilitating synchronization of a remote file system (RFS) and a local file system (LFS) is disclosed, where the RFS includes a plurality of file system objects each associated with metadata. The method includes maintaining a global revision identifier associated with the RFS, where the global revision identifier has a variable state, establishing a connection with a user, providing access to the RFS to the user, receiving an instruction to modify the RFS from the user, and responsive to the RFS being modified, updating the metadata associated with one or more of the file system objects of the RFS based on a state of the global revision identifier. The step of updating the metadata can include altering the metadata of the one or more file system objects (folders) to reflect the state of the global revision identifier. More particularly, when a file is updated, the metadata of the folder in which the file is located is updated. A particular method includes updating the state of the global revision identifier to a new state prior to updating the metadata based on the state of the global revision identifier.

The metadata of the RFS can also be partitioned into a folders portion and a files portion, where the folders portion includes a plurality of folder records each storing folder metadata associated with a folder of the RFS, the files portion includes a plurality of file records each storing file metadata associated with a file of the RFS, and the folder metadata for each of the folder records includes revision data indicative of the state of the global revision identifier at some point in time. Accordingly, the step of updating the metadata of the one or more file system objects includes updating the revision data of the folder metadata.

The invention also provides RFS metadata to a local file storage system (the local cloud) for use during a rescan synchronization. A particular method includes establishing a second connection with a local file storage system associated with the LFS, receiving a synchronization request from the local file storage system, and providing metadata associated with at least some of the file system objects of the RFS to the local file storage system. Additionally, the synchronization request from the local cloud server can include data indicative of at least one requested folder within the RFS, and the step of providing metadata can include providing folder metadata associated with one or more identified folders of the RFS to the local cloud server. In such a case, the folder metadata includes revision data that is indicative of a state of the global revision identifier the last time an identified folder of the RFS was modified. Even more particularly the method can include the steps of receiving a file listing request from the local file storage system for at least some of the plurality of folders identified by the folder metadata provided to the local cloud, and providing file metadata for files stored in each folder identified in the file listing request to the local file storage system. Any of the above methods can also include providing a current state of the global revision identifier to the local file storage system.

A remote file storage system is also disclosed. The remote file storage system includes memory for storing data, a user interface operative to establish a connection with a user of the client and to provide access to the RFS to the user, and an RFS updater. The stored data includes a RFS including metadata and a global revision identifier having a variable state. The RFS updater is configured to update the metadata associated with one or more of the file system objects based on a state of the global revision identifier, responsive to the RFS being modified by the user. In a particular embodiment, the RFS updater is configured to alter the metadata of the one or more file system objects (one or more folders) to reflect the state of the global revision identifier. If the alteration is to a file, then the RFS updater is configured to update the metadata associated with the folder containing the file. In another particular embodiment, the RFS updater is configured to update the state of the global revision identifier to a new state prior to updating the metadata based on the global revision identifier.

The metadata associated with the RFS can also be partitioned into a folders portion and a files portion as described above. In such a case, the RFS updater is configured to update the revision data of the folder metadata responsive to the RFS being modified by the user.

In another particular embodiment, the remote file storage system includes a remote synchronizer, and the client interface is configured to establish a second connection with a local file storage system associated with an LFS and to receive a synchronization request from the local file storage system. The remote synchronizer is also configured to provide metadata associated with at least some of the file system objects of the RFS to the local file storage system. More particularly, the synchronization request from the local cloud can include at least one requested folder within the RFS, and the remote synchronizer is configured to provide folder metadata associated with one or more identified folders of the RFS to the local file storage system, where the provided folder metadata includes revision data indicative of the state of the global revision identifier the last time an identified folder of the RFS was modified. The client interface can also be configured to receive a file listing request from the local file storage system for at least some of the plurality of folders associated with the folder metadata provided to the local file storage system, and the remote synchronizer is further configured to provide file metadata for files stored in each folder identified in the file listing request. The remote synchronizer is also configured to provide a current state of the global revision identifier to the local file storage system.

Importantly, the remote file storage system includes of the invention includes a means for tracking a revision state associated with the RFS and a means for updating the metadata associated with one or more of the file system objects based on the revision state responsive to the RFS being modified by the user.

A method for synchronizing an LFS with a remotely-located RFS is also disclosed and includes the steps of establishing a network connection with a remote file storage system, initiating a synchronization process with the remote file storage system, providing at least one namespace identifier to the remote file storage system, and providing at least one prior revision identifier to the remote file storage system. Here, the namespace identifier is indicative of at least a portion of a subscribed namespace synchronized on the RFS and the LFS, and the prior revision identifier defines a state associated with the RFS when the portion of the subscribed namespace was last synchronized. A more particular method includes the step of receiving RFS metadata from the remote file storage system, where the RFS metadata is associated with file system objects in the associated portion of the subscribed namespace that have been modified since the prior synchronization. In a still more particular method, the RFS metadata includes folder metadata associated with the one or more folders of the subscribed namespace, and the method further includes querying the remote file storage system for file metadata associated with files stored in at least some of the one or more folders. Still another particular method includes the steps of receiving a current revision identifier from the remote file storage system, where the current revision identifier defines a current state associated with the RFS, and storing the current revision identifier in LFS metadata associated with at least one folder of the portion of the subscribed namespace on the LFS associated with the namespace identifier.

A local file storage system storing an LFS that is synchronized with a remotely-stored RFS includes memory for storing data, a remote cloud interface configured to establish a connection with the remote file storage system, and a synchronizer. The data includes the LFS, which includes a plurality of file system objects and associated LFS metadata. The data also includes a plurality of prior revision identifiers, where each prior revision identifier defines a state of the RFS at a time when an associated folder of a subscribed namespace between the LFS and the RFS was last synchronized. The synchronizer of the system is configured to initiate a synchronization process with the remote file storage system, provide at least one namespace identifier to the remote file storage system, where the namespace identifier is indicative of at least a portion of the subscribed namespace, and provide at least one prior revision identifier associated with the namespace identifier to the remote file storage system. In a particular embodiment, the remote cloud interface receives RFS metadata from the remote file storage system, where the RFS metadata is associated with file system objects in at least the portion of the subscribed namespace that have been modified since the prior synchronization. More particularly, the RFS metadata includes folder metadata associated with the one or more folders of the subscribed namespace, and the synchronizer is configured to query the remote file storage system for file metadata associated with files stored in at least some of the one or more folders. In still another particular embodiment, the remote cloud interface is configured to receive a current revision identifier from the remote file storage system, where the current revision identifier defines a current state associated with the RFS, and the synchronizer is configured to store the current revision identifier in LFS metadata associated with at least one folder of the portion of the subscribed namespace on the LFS associated with the namespace identifier.

Non-transitory, electronically-readable media having code embodied therein for causing an electronic device to perform the methods of the present invention are also disclosed.

BRIEF DESCRIPTION OF THE DRAWINGS

The present invention is described with reference to the following drawings, wherein like reference numbers denote substantially similar elements:

FIG. 8 is a relational diagram showing the functional aspects of the remote cloud server of FIG. 7;

FIG. 9 is a table indicating how metadata of the remote file system is updated based on the state of a revision identifier in response to changes to the remote file system;

FIG. 12A shows a table illustrating part of a full rescan synchronization (FRS) according to the present invention;

DETAILED DESCRIPTION

The present invention overcomes the problems associated with the prior art, by providing a system and method for efficiently synchronizing file systems having large namespaces between the cloud and the client's local device. In the following description, numerous specific details are set forth (e.g., particular functional modules, particular metadata examples, particular API examples, etc.) in order to provide a thorough understanding of the invention. Those skilled in the art will recognize, however, that the invention may be practiced apart from these specific details. In other instances, details of well-known cloud computing practices and components have been omitted, so as not to unnecessarily obscure the present invention.

Figure 1:
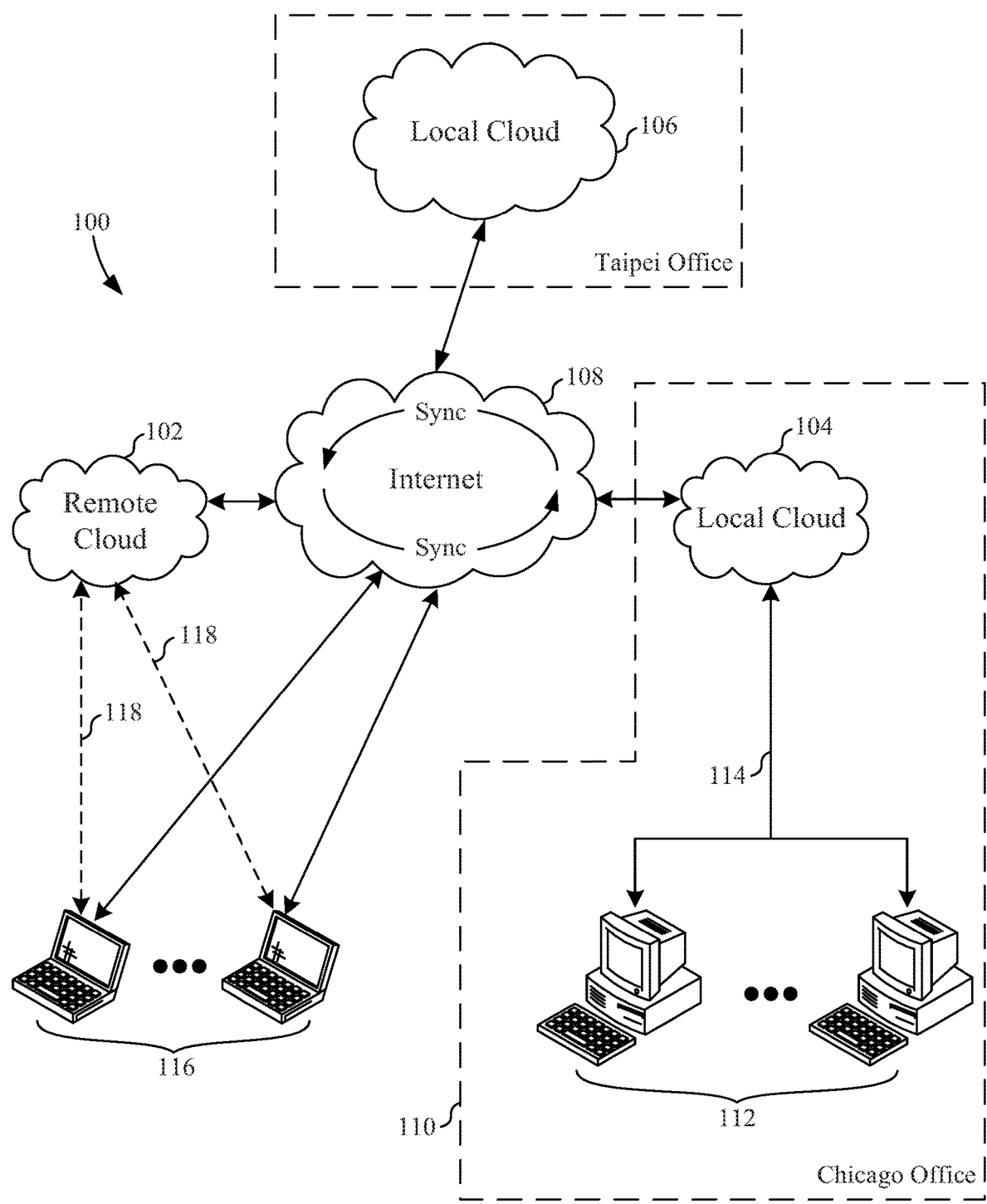
FIG. 1 is a diagram of a cloud computing system.

FIG. 1 shows a cloud computing system 100 that includes a remote cloud server 102, a local cloud server 104, and a local cloud server 106, which communicate and are synchronized via the Internet 108. Local cloud server 104 can be hosted, for example, by a file server in an office 110 and is, therefore, sometimes referred to as an office local cloud (OLC). In this example, the client's office 110 is located in Chicago, Ill. A local file system e.g., namespace and file data) stored on local cloud server 104 is synchronized with remote cloud server 102 to provide local and remote data access and remote data security. In this embodiment, at least a portion of the local file system stored on local cloud server 104 is bi-directionally synchronized with remote cloud server 102. Although one-way synchronization of the local and remote file systems is also possible. Similarly, the client's local file system (e.g., namespace and file data) stored on local cloud server 106, which is located in the client's office in Taipei, Taiwan, is also synchronized with remote cloud server 102.

Local users 112 of the client can access local file system objects stored on local cloud 104 via a local network 114. Optionally, local cloud 104 can extend access for local users 112 to the client's remote file system stored on remote cloud server 102 via Internet 108. Similarly, local cloud server 106 also provides local file system access to its own local users (not shown) of the client and optionally extends those local users access to the remote file system on remote cloud server 102. Remote users 116 of the client can access the client's remote file system, including the client s global namespace and associated data files, by accessing remote cloud 102 via Internet 108 or some other connection 118 with remote cloud server 102.

In the present embodiment, the client associated with local cloud servers 104 and 106 is a customer of a cloud service provider operating remote cloud server 102. It will be understood, therefore, that remote cloud server 102 can store and synchronize file systems associated with other customers as well, for example, on a subscription basis. Additionally, the present invention will be primarily described hereinafter with reference to local cloud server 104 and remote cloud server 102, but the present invention can be equally applied between local cloud server 106 and remote cloud server 102.

Figure 2:
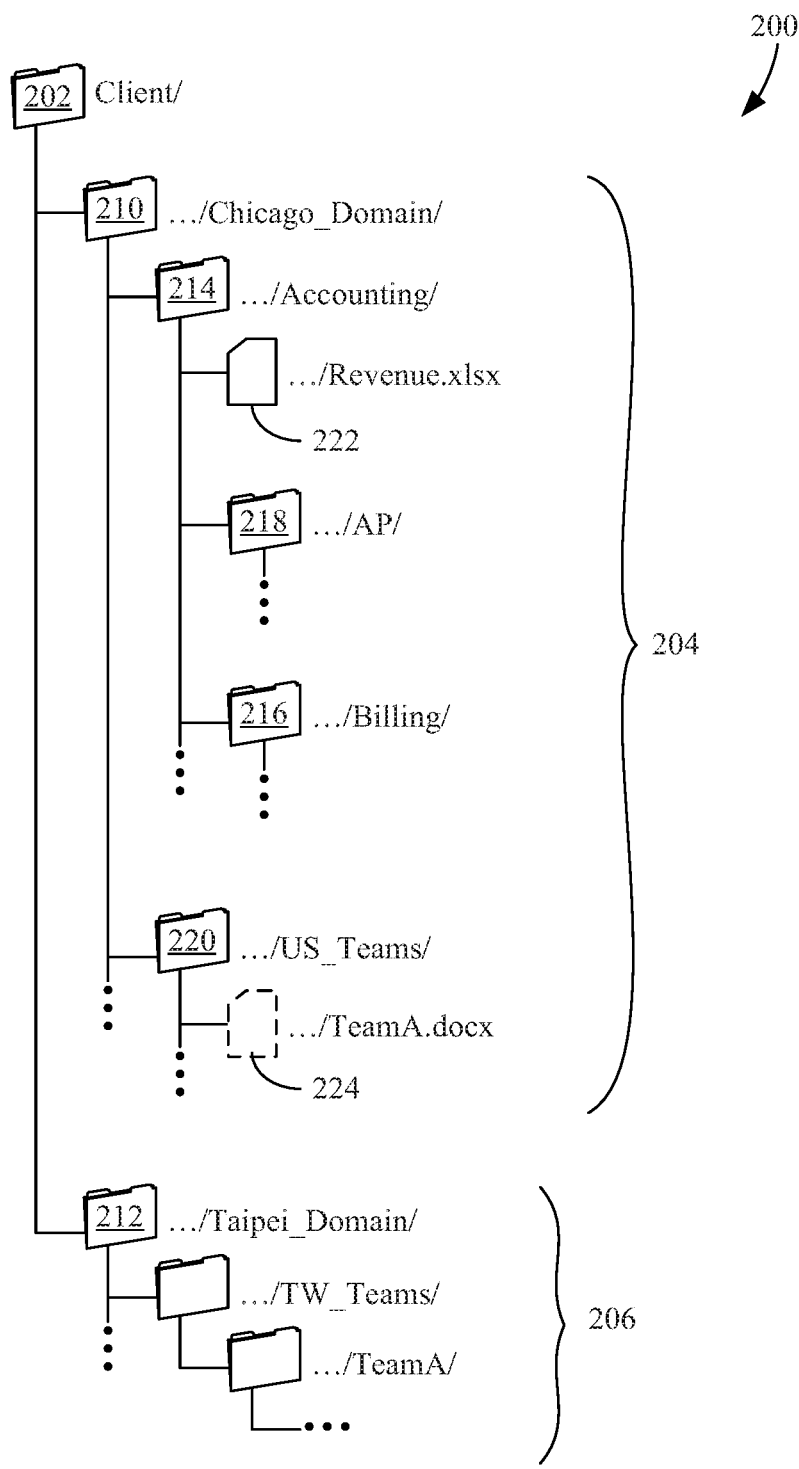
FIG. 2 is a diagram of a global namespace for a client's remote file system stored on the remote cloud server of FIG. 1.

FIG. 2 shows a global namespace 200 for a remote file system (RFS) of a particular client 202, which is stored on remote cloud server 102. Global namespace 200 includes a plurality of subscribed namespaces, including a subscribed namespace 204 and a subscribed namespace 206. Subscribed namespace 204 identifies the portions of the client's RFS (e.g., "Chicago_Domain" folder 210 and its subtrees) that are synchronized with local cloud server 104, which is physically located in the Chicago office of client 202. Accordingly, the file system corresponding to subscribed namespace 204 is stored on remote cloud server 102 as part of the RFS and will be stored on local cloud server 104 as all or part of its local file system. Similarly, subscribed namespace 206 includes the portions of the client's RFS (e.g., "Taipei_Domain" folder 212 and its subtrees) that are synchronized with local cloud server 106, which is physically located in the Taipei, Taiwan office of client 202.

Global namespace 200 is exemplary in nature. Indeed, the subscribed namespace for a particular local cloud server can be customized as desired. For example, it could be that client 202 desires that local cloud server 104 be subscribed to all folders of global namespace 200 (e.g., namespaces 204 and 206), whereas local cloud server 106 only be subscribed to namespace 206, Additionally, global namespace 200 can include a remote-cloud-only namespace portion stored only on remote cloud server 102, subscribed namespaces of other local cloud servers, etc.

As changes are made to global namespace 200 (e.g., by remote users 116, extended local users 112 from local cloud 104, etc.), the synchronized portions of the global namespace 200 (and associated file system objects) will become out of date with their respective local cloud servers 104 and 106. Accordingly, it is desirable to re-synchronize the subscribed namespaces of RFS with the corresponding local file system (LFS) stored on a local cloud server, such that the subscribed namespace and its associated data objects of the RFS and LFS become identical, or at least nearly identical, as of some particular time. This means that the file system objects (metadata and data files) stored in the LFS will also be stored in the RFS, and vice versa.

In summary, while client 202 might want its users to have access to the entire global namespace 200 and remote file system via remote cloud server 102, the client 202 has restricted synchronization between the RFS and the LFS on local clouds 104 and 106 to their respective subscribed namespaces 204 and 206. Even though each of subscribed namespaces 204 and 206 represents only a portion of the global namespace 200 and the RFS, the subscribed namespaces 204 and 206 themselves can still be extremely large.

As indicated above, known rescan synchronization methods are extremely CPU, bandwidth, and memory intensive, especially for file systems with very large namespaces. The present invention overcomes these problems by providing a system and method for efficiently performing snapshot-based synchronizations, particularly FRS and LRS, even for very large namespaces consisting of hundreds of millions of objects or more. The invention makes rescan synchronizations faster, more efficient, and scalable by identifying the data set of the subscribed namespace 204 that may have changed (e.g., that changed itself or is associated with a change) since the last synchronization. The invention then limits the metadata snapshot that is transferred to local cloud server 104 to this mutated data set so that file system operations can be generated and applied to bring the mutated portions of the subscribed namespace 204 back into synchronization. The invention provides these advantages by (A) effectively partitioning the global namespace 200 and (B) identifying and efficiently synchronizing the minimum data set.

Figure 3A:
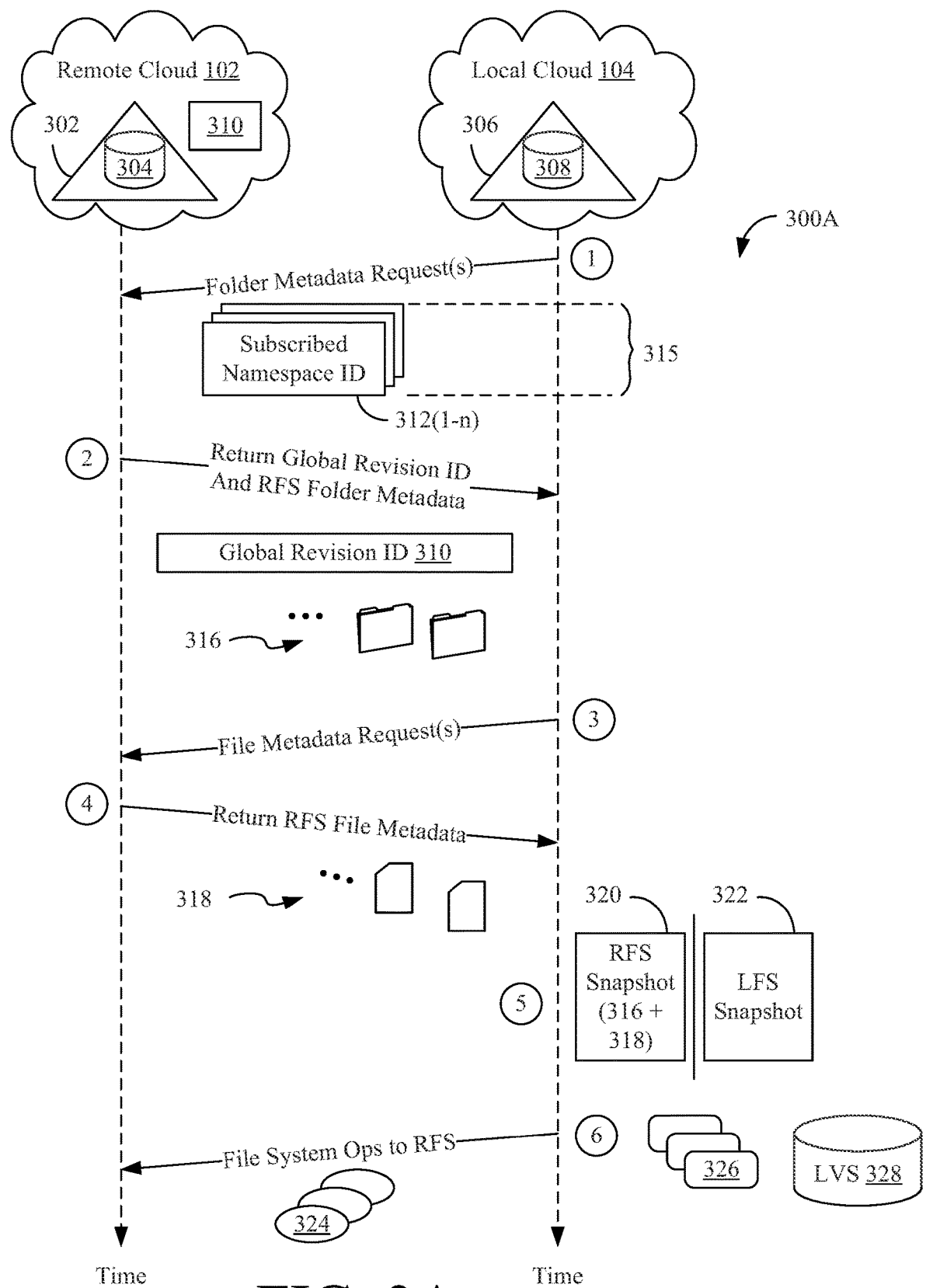
FIG. 3A is a diagram summarizing a process for synchronizing a subscribed namespace of a remote file system and a local file system for the first time according to the present invention.

FIG. 3A graphically illustrates a method 300A for synchronizing subscribed namespace 204 (and associated data files) between an RFS 302 and an ITS 306 for the first time according to the present invention. As shown therein, remote cloud server 102 stores an RFS 302, which includes RFS metadata 304 and associated data files (not shown whereas local cloud server 104 stores an LFS 306, which includes LFS metadata 308 and associated data files (not shown). Time extends down the page in the direction of the dashed arrows.

RFS metadata 304 defines the global namespace 200 associated with client 202. According to the invention, RFS metadata 304 is partitioned between files and folders, such that folder metadata is maintained separately (e.g., in a different table) from file metadata, as will be described in more detail below.

Remote cloud server 102 also maintains a global revision identifier 310 that indicates a current revision state of global namespace 200. In particular, the current state of the global revision identifier indicates the largest state (value) of the revision identifier that is associated with any folder within global namespace 200 at the current time. The state of global revision identifier 310 is changed in a predetermined way (e.g., incremented, etc.) in response to file system actions being made to RFS 302 by users. In this embodiment, remote cloud server 102 maintains one global revision identifier 310 per client 202 (e.g., one global revision identifier per customer), and all local cloud servers 104 and 106 associated with that client 202 utilize the same global revision identifier 310 as will be described in more detail below. Remote cloud server 102 can maintain a separate global revision identifier for each customer it serves.

As actions are performed against global namespace 200 by users accessing remote cloud server 102, RFS metadata 304 will be modified according to the user's file system actions. Remote cloud server 102 implements operations to expose these file system changes to those accessing remote cloud server 102 and global namespace 200. Remote cloud 102 also keeps track of the changes made to the global namespace 200 by these file system actions by including revision data in the folder record of RFS metadata 302 for each folder in global namespace 200. A folder's revision data then is updated based on the revision identifier when a file system action related to that folder is made by the user. In other words, the state of the revision identifier stored in the folder metadata, relative to the current state of the global revision identifier 310, indicates the last time an action was performed on the associated folder that may have changed its contents. A list of file system actions and their effects on the RFS metadata 304 and revision identifiers will be discussed below with reference FIG. 9.

Figure 4:
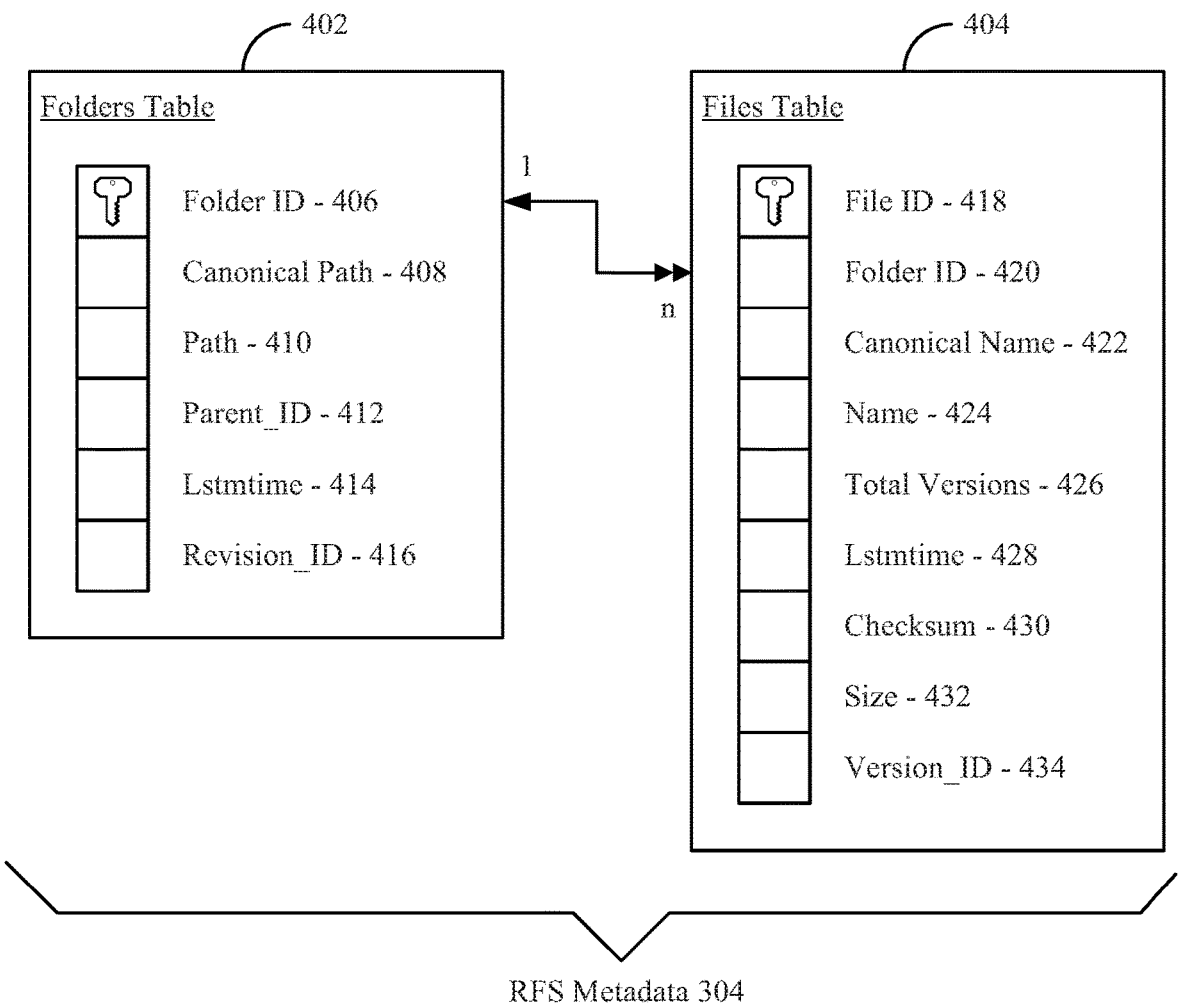
FIG. 4 shows an exemplary data structure for storing metadata representative of the client's remote file system on the remote cloud server of FIG. 1.

FIG. 4 shows an exemplary data structure for RFS metadata 304. As shown in FIG. 4, RFS metadata 304 is partitioned into two tables: a Folders table 402 and a Files table 404. As a result, RFS metadata 304 is queryable in an efficient manner, because folders normally constitute a small percentage (commonly 10-12%) of the global namespace 200 relative to files.

Each record of Folders table 402 represents a folder in the global namespace 200 of client 202 and includes a Folder ID field 406, a Canonical Path field 408, a Path field 410, a Parent_ID field 412, a Lstmtime field 414, and a Revision_ID field 416. Folder ID field 406 is the key field that uniquely identifies the particular folder record. Canonical Path field 408 includes a standardized path name. Path field 410 includes the local display path. Parent_ID field 412 includes the Folder ID value of the parent folder of the folder represented by the current record. Lstmtime field 414 includes data indicative of the last time the associated folder was modified. Revision_ID field 416 includes data indicative of a state of the global revision identifier 310 when the corresponding folder, or a file system object associated with that folder e.g., a file object contained within that folder), was last modified by user action.

Each record of Files table 404 represents a file in the global namespace 200 of client 202 and includes a File ID field 418, a Folder ID field 420, a Canonical Name field 422, a Name field 424, a Total Versions field 426, a Lstmtime field 428, a Checksum field 430, a Size field 432, and a Version_ID field 434, File ID field 418 is a key field and uniquely identifies the particular file record. Folder ID field 420 includes data identifying a record in Folders table 402 (the folder in which the file resides). Canonical Name field 422 includes a standardized file name. Name field 424 includes data indicative of the local display name. Total Versions field 426 includes data indicative of how many versions of the file are kept in RFS 302. Lstmtime field 428 includes data indicative of the last time the associated file was modified, Checksum field 430 includes data indicative of a checksum(e.g., Sha512, etc.) of the associated file. Size field 432 includes data indicative of the size of the associated data file stored in mass data storage of RFS 302. Version_ID field 434 includes data indicative of the current version of the associated file.

It should be noted that the tables provided in FIG. 4 are exemplary in nature. Each folder and file record in the tables could include additional or fewer fields as needed. Additionally, additional tables can be included in RFS metadata 304 if desirable. For example, a table containing version metadata for each version of a data file stored in RFS 302 could be linked to the file records in files table 404. These and other embodiments are possible.

Returning to FIG. 3A, at (1), local cloud server 104 initiates the synchronization with remote cloud server 102 by providing an initial synchronization request to remote cloud server 102. Here the initial synchronization request comprises one or more folder listing queries to remote cloud server 102, requesting the folder metadata of RFS metadata 304 for the entire subscribed namespace 204, Local cloud server 104 queries remote cloud server 102 using one or more subscribed namespace identifiers 312(1-n) associated with subscribed namespace 204. Each subscribed namespace identifiers 312(1-n) comprises a path of a topmost folder in the subscribed namespace 204. Here, because folder 210 ("/Chicago_Domain/") is the only top-most folder in subscribed namespace 204, local cloud server 104 makes a single folder listing query using a subscribed namespace identifier 312 corresponding to the path of folder 210, Alternatively, the subscribed namespace identifier 312 could comprise a unique identifier that remote cloud server 102 could use to lookup the subscribed namespace 204 associated with local cloud server 104.

Stated another way, subscribed namespace identifiers 312(1-n) represent a requested "namespace view" 315 of subscribed namespace 204 that is currently of interest to local cloud server 104. Because this is the initial synchronization of subscribed namespace 204 between local cloud server 104 and remote cloud server 102, the requested namespace view 315 corresponds to the entire subscribed namespace 204 stored in RFS 302.

Remote cloud server 102 receives the folder listing query, including the subscribed namespace identifier 312 (corresponding to folder 210) and then retrieves folder metadata 316 for each of the folders in subscribed namespace 204. Because, in this embodiment, remote cloud server 102 provides folder metadata 316 for the folder specified in the subscribed namespace identifier 312 and any sub-folders of that specified folder, a subscribed namespace identifier 312 that identifies top-most folder 210 will cause remote cloud 102 to return folder metadata for every sub-folder in subscribed namespace 204.

Accordingly, at (2), remote cloud server 102 provides folder metadata 316 for each folder in subscribed namespace 204 to local cloud server 104. Remote cloud server 102 also provides the current state of global revision identifier 310 to local cloud server 104, before or after the folder metadata 316. Local cloud server 104 then receives and saves the folder metadata 316 and the current state of global revision identifier 310 in LFS 306. The global revision identifier 310 denotes the current state version) of the folder portion of global namespace 200 at this point in time on remote cloud server 102.

Thereafter, at (3), local cloud server 104 makes one or more file listing requests (queries) to remote cloud server 102 for file metadata 318 associated with each folder defined by the returned folder metadata 316. In this embodiment, local cloud server 104 queries remote cloud server 102 for file metadata on a folder-by-folder basis, according to the paths contained in the returned folder metadata 316.

Remote cloud server 102 receives the folder-specific file listing queries, and then searches RFS metadata 304 for file metadata 318 for the requested folders. Then at (4), remote cloud server 102 provides the file metadata 318 for each specified folder to local cloud server 104. In the present embodiment, local cloud server 104 makes a separate query for file metadata for each folder identified by folder metadata 316. This enables local cloud server 104 to better control the synchronization process, e.g., for bandwidth and resource reasons. However, other listing queries are possible (e.g. requesting folders as a batch).

The returned folder metadata 316 and file metadata 318 together represent a RFS metadata snapshot 320 of the subscribed namespace 204 stored on RFS 302 at a time represented by the state of global revision identifier 310 provided from remote cloud server 102. At (5), local cloud server 104 compares (e.g., on a path-by-path basis) the RFS metadata snapshot 320 with an LFS metadata snapshot 322 taken of LFS metadata 308 associated with the subscribed namespace 204. Based on this comparison, local cloud server 104 generates, at (6), RFS operations 324 and LFS operations 326 and communicates the RFS operations 324 to remote cloud server 102 where they are applied to RFS 302. Local cloud server 104 also applies LFS operations 326 to LFS 306. After the file system operations 324 and 326 are applied, the folders and files (both metadata and file data) of subscribed namespace 204 will be synchronized in both RFS 302 and LFS 306 at the time associated with global revision identifier 310.

As file system objects of subscribed namespace 204 are synchronized, local cloud server 104 performs several other actions. First, as those folders on LFS 306 are synchronized, local cloud server 104 associates the state of global revision identifier 310 provided by remote cloud server 102 with each folder record in LFS metadata 308 associated with the namespace view 315 defined by subscribed namespace identifier(s) 312(1-n). Here, assuming the entire subscribed namespace 204 is successfully synchronized, the state of global revision identifier 310 will be stored as a prior revision identifier in each folder record of 306 that is part of subscribed namespace 204. This way, for a specific folder record in metadata 308 that is part of subscribed namespace 204, local cloud server 104 knows that the specific folder record and its contents in LFS 306 matches the state of the corresponding folder record and its contents in RFS 302 as of the time associated with state of the global revision identifier 310 provided at (2) by remote cloud server 102. Additionally, it should be noted that each particular folder record in LFS metadata 308 is updated with the state of global revision identifier 310 after that folder and its contents have been successfully synchronized. Otherwise, if the prior revision identifier for that folder record in LFS metadata 308 were updated before the synchronization completed and the synchronization process later failed or was interrupted, the synchronization state of that folder would be incomplete.

Second, as part of the initial synchronization shown in FIG. 3A, local cloud server 104 initializes and populates LVS database 328 as file system objects are successfully synchronized as discussed above. LVS database 328 stores extended attributes about every file system object (e.g., files and folders) that have been successfully synchronized between RFS 302 and LFS 306. For subsequent rescan synchronizations, LVS database 328 is used to help determine which file system objects are already in sync and prevent them from being synchronized again.

Figure 5:
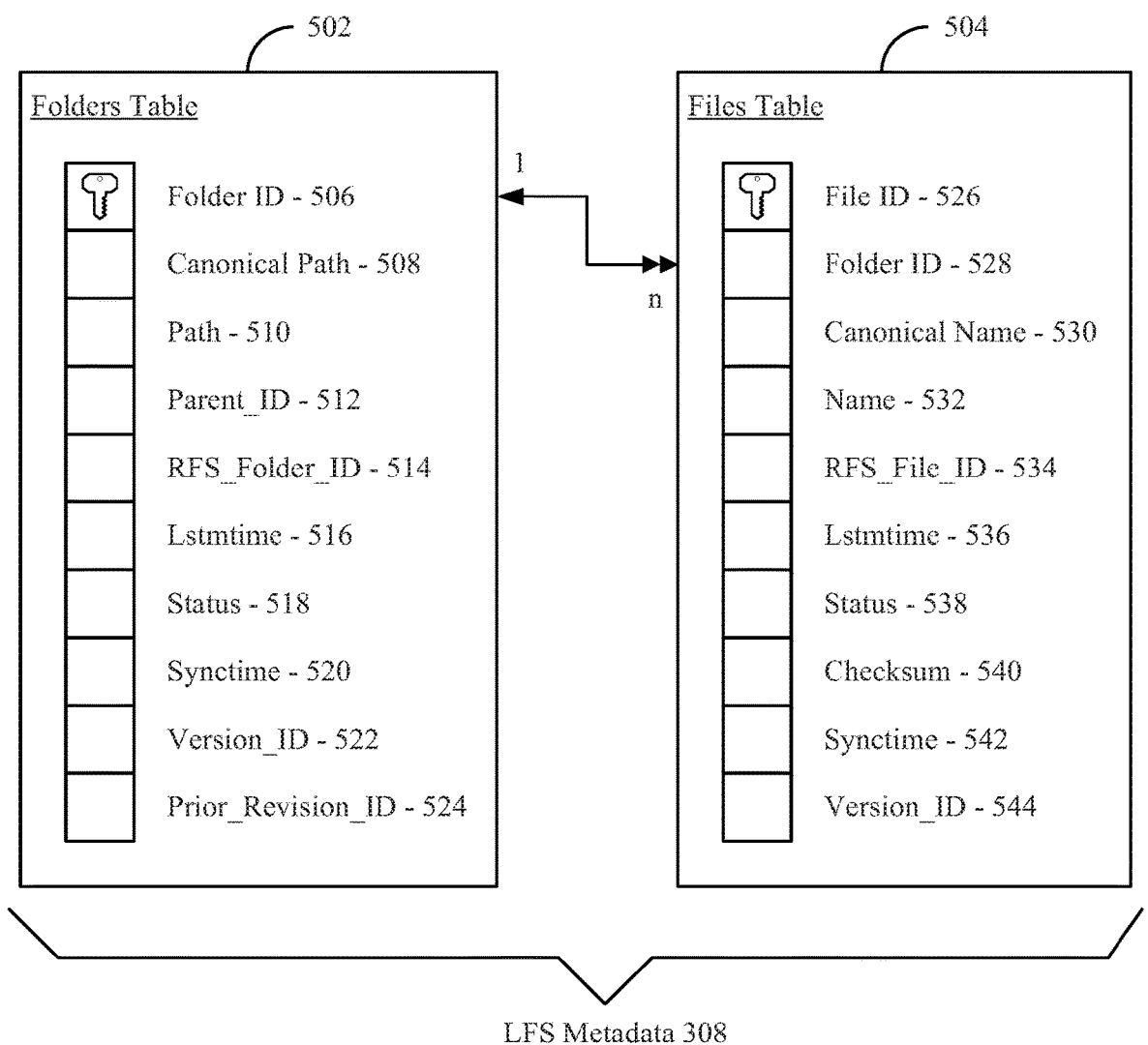
FIG. 5 shows an exemplary data structure for storing metadata representative of the client's local file system on the local cloud server of FIG. 1.

FIG. 5 shows an exemplary data structure for storing LFS metadata 308. Like RFS metadata 304, LFS metadata 308 is partitioned into two tables: a Folders table 502 and a Files table 504. As a result, LFS metadata 308 is also queryable in an efficient manner.

Each record of Folders table 502 represents a folder of LFS 306 that is associated with subscribed namespace 204. Folders table 502 might also include folder records for folders that are private and not synchronized. Each record in Folders table 502 includes a Folder ID field 506, a Canonical Path field 508, a Path field 510, a Parent_ID field 512, an RFS_Folder_ID field 514, a Lstmtime field 516, a status field 518, a synctime field 520, a Version_ID field 522, and a Prior_Revision_ID field 524. Folder ID field 506 is the key field that uniquely identifies the particular folder record. Canonical Path field 508 includes a standardized path name. Path field 510 includes the local display path. Parent_ID field 512 includes the Folder ID value of the parent folder of the folder represented by the current record. RFS_Folder_ID field 514 includes the Folder_ID of the corresponding folder of RFS metadata 304. Lstmtime field 516 includes data indicative of the last time the associated folder was modified. Status field 518 includes information indicative of the current synchronization status (i.e. synced, skipped, pending, etc.) of the folder represented by the current record. Synctime field 520 includes data indicative of the last time the current folder was successfully synchronized. Version_ID field 522 includes data indicative of the current version of the associated folder. Prior_Revision_ID field 524 includes data indicative of the state of the global revision identifier 310 that was provided to local cloud server 104 the last time the associated folder was successfully synchronized.

Each record of Files table 504 represents a file stored in LFS 306 that is associated with subscribed namespace 204. Each record in Files table 504 includes a File ID field 526, a Folder ID field 528, a Canonical Name field 530, a Name field 532, an RFS_File_ID_field 534, a Lstmtime field 536, a Status field 538, a Checksum field 540, a Synctime field 542, and a Version_ID field 544. File ID field 526 is the key field that uniquely identifies the particular record. Folder ID field 528 includes data identifying a record in Folders table 502 (the folder in which the file resides). Canonical Name field 530 includes a standardized file name. Name field 532 includes data indicative of the local display name. RFS_File_ID field 534 includes the File ID of the corresponding file stored in RFS 302, Lstmtime field 536 includes data indicative of the last time the associated file was modified. Status field 538 includes information indicative of the current synchronization status (i.e. synced, skipped, pending, etc.) of the file represented by the current record. Checksum field 540 includes data indicative of a checksum (e.g., Sha512, etc.) of the associated file. Synctime field 542 includes data indicative of the last time the associated file was successfully synchronized. Version_ID field 544 includes data indicative of the current version of the associated file.

The tables provided in FIG. 5 are again exemplary in nature. Each folder and file record in the tables could include additional or fewer fields as needed. Additional tables can be included in LFS metadata 308, for example, as described above.

Figure 6:
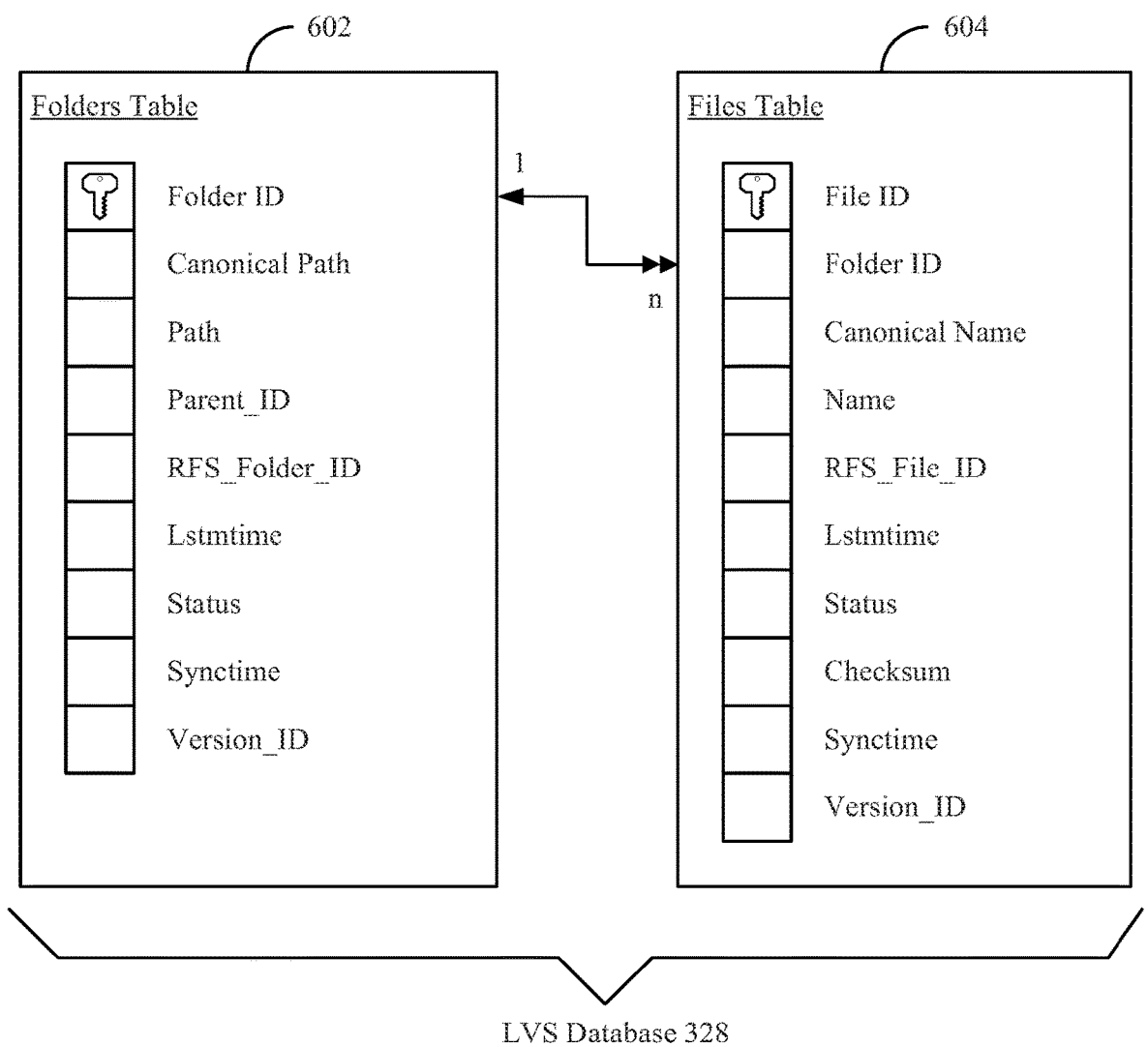
FIG. 6 shows an exemplary data structure for storing records in a last valid sync (LVS) database according to the present invention.

FIG. 6 shows an exemplary data structure for storing data in LVS database 328. LVS database 328 contains the extended attributes related to file synchronization for each file and folder that is successfully synchronized in subscribed namespace 204. Thus, each synchronized object in subscribed namespace 204 will have an entry in LVS database 328. Local cloud server 104 updates LVS database 328 after each successful synchronization by creating records, deleting records, modifying records, and/or populating records with the particular attribute information. LVS database 328 includes a folders table 602 and files table 604 and is, therefore, searchable in an efficient manner. The fields in folders table 602 and files table 604 are similar to those described above in FIGS. 4 and 5 and will, therefore, not be discussed in detail. As above, the tables and fields provided in FIG. 6 are exemplary in nature. Each folder and file record in tables 602 and 604 could include additional fields (e.g., fields for unique file system identifiers, etc.) or fewer fields as desired. Additional tables could also be incorporated if desirable (e.g., multiple folders and files tables specific to RFS 302 and LFS 306, respectively; tables for one-way vs. two-way synchronizations; etc.).

Returning to FIG. 3B, following the initial synchronization between remote cloud server 102 and local cloud server 104 described in FIG. 3A, users accessing the subscribed namespace 204 on remote cloud server 102 will modify file system objects therein. Accordingly, the Revision H) fields 416 of the folder record(s) 402 in RFS metadata 304 associated with those modifications will be updated based on a state of the global revision identifier 310. Associating revision identifier information with the folder records 402 enables the local cloud server 104 (or in alternative embodiments the remote cloud server 102) to quickly identify the data set of RFS 302 that may have changed with respect to a prior revision state of LFS 306 for a rescan synchronization (FRS or LRS).

Figure 3B:
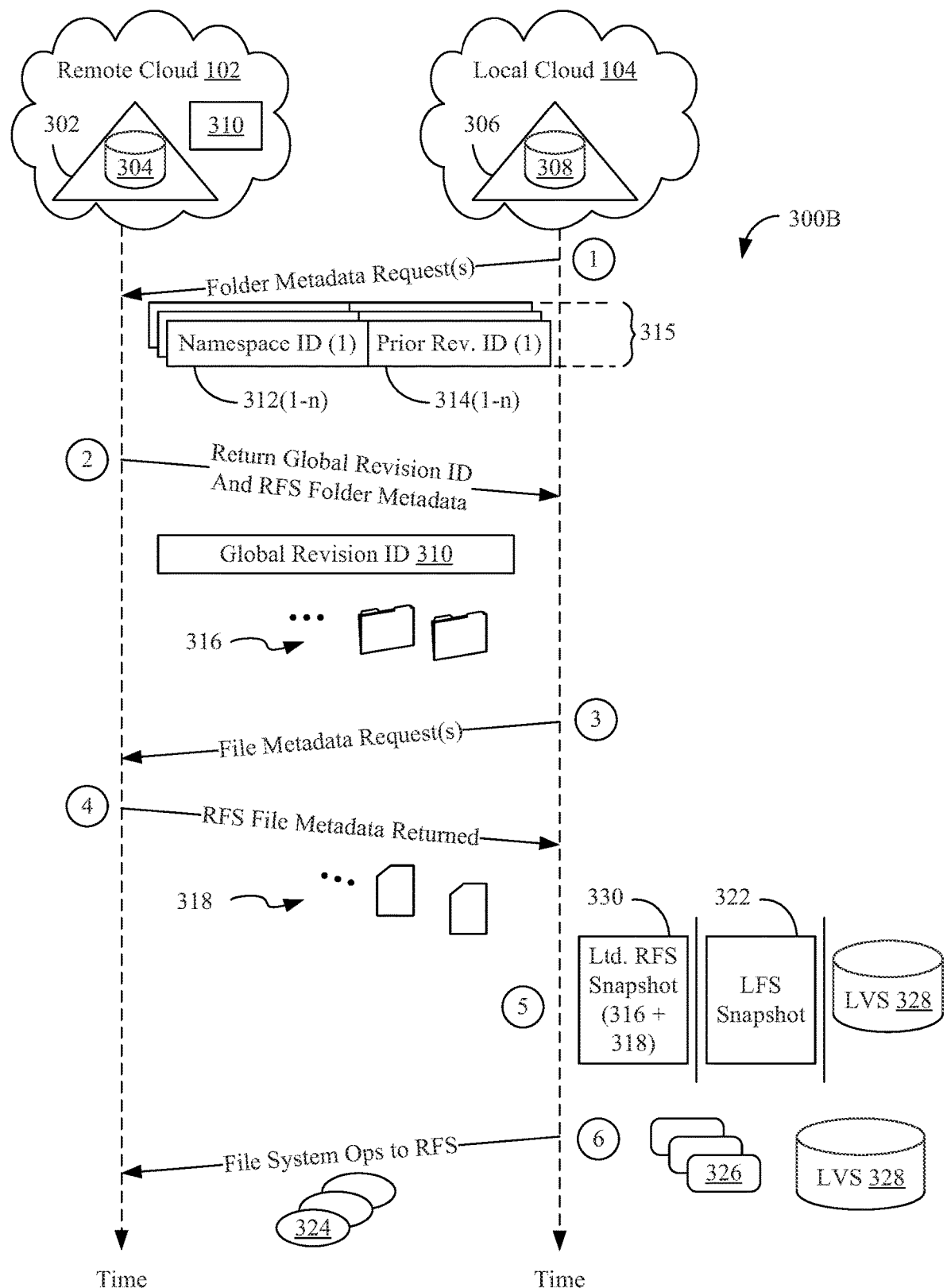
FIG. 3B is a diagram summarizing a process for resynchronizing all or parts of the subscribed namespace according to the present invention.

FIG. 3B graphically illustrates a method 300B for resynchronizing all or a portion of subscribed namespace 204 (and the associated data files) between RFS 302 and LFS 204. Method 300B is performed in response to a request for an FRS or LRS from local cloud server 104 or remote cloud server 102. In response to a call for an FRS or LRS, local cloud server 104 can use method 300B to resynchronize the entire subscribed namespace 204 in the case of an FRS or only portions of interest of subscribed namespace 204 in the case of an LRS. Regardless of whether an FRS or LRS is desired, the invention applies equally to either and provides the advantage that it limits the data set that needs to be transferred to local cloud server 104 from remote cloud server 102 to the portions of the requested namespace view that may have changed (mutated) since they were last synchronized. File system objects that remote cloud server 102 know have not changed can, therefore, be excluded from the data set transferred to local cloud server 104. Limiting this dataset, therefore, also optimizes the comparison process of local and remote file systems during the rescan synchronization.

As before, remote cloud server 102 implements folder listing queries to lookup portions of global namespace 200 by specific folder paths, which enables local cloud server 104 to search for and download information about the folder subtrees and associated data files of subscribed namespace 204 that are of interest to it for the particular rescan synchronization. The queries also enables local cloud server 104 to download content for only those portions of subscribed namespace 204 that may have changed in some way in RFS 302 since they were last synchronize. Because this mutated data set is usually much smaller than the data set for the entire portion of interest of subscribed namespace 204, the invention greatly reduces the amount of data that needs to be transferred between remote cloud server 102 and local cloud server 104 during a rescan synchronization. This, in turn, reduces the synchronization bandwidth requirements between remote cloud server 102 and local cloud server 104, speeds up the comparison process, because local cloud server 104 only processes a small portion of the RFS metadata 304, and enables remote cloud server 102 to serve many more clients with the same server-side resource capacity (e.g., processor capacity, memory capacity, bandwidth, etc.).

As shown at (1) in FIG. 3B, when local cloud server 104 initializes a rescan synchronization process, it queries remote cloud server 102 using one or more subscribed namespace identifiers 312(1-*n*) and the prior revision identifiers 314(1-*n*) associated with those subscribed namespace identifiers 312(1-*n*). In the present embodiment, each subscribed namespace identifier 312(1-*n*) identifies a folder (e.g., by canonical folder path from Canonical Path field 508 of an associated record 502, by RFS_Folder_ID 514, etc.) in subscribed namespace 204. The associated prior revision identifiers 314(1-*n*), therefore, include the information stored in the Prior_Revision_ID fields 524 of the same folder records 502 of the requested namespace, respectively. Each prior revision identifier 314(1-*n*) corresponds to the state of a global revision identifier 310 communicated from remote cloud server 102 the last time the associated folder was successfully synchronized.

As an aside, the folder listing queries implemented at (1) by local cloud server 104 in methods 300A and 300B can be the same. For example, while providing prior revision identifiers 314(1-*n*) at (1) in method 300B can have useful advantages and enable alternative methods that will be discussed below, providing these prior revision identifiers 314(1-*n*) is optional.

The folders represented by subscribed namespace identifiers 312(1-*n*) represent a namespace view 315 requested by local cloud server 104 for rescan synchronization. This namespace view 315 could comprise one identifier 312 for top-most folder 210 in subscribed namespace 204 in the case of an FRS, or it could comprise multiple identifiers 312(1-*n*) each identifying a folder of subscribed namespace 204 for rescan synchronization in the case of an LRS.

Remote cloud server 102 receives the subscribed namespace identifiers 312(1-*n*) and associated prior revision identifiers 314(1-*n*) and, at (2), searches for folder records in table 402 of RFS metadata 304 for the requested namespace view 315 to identify folder records 402 of folders contained therein. The folder records 402 that are searched by remote cloud server 102 include the folder identified by each subscribed namespace identifier 312 and any of its subfolders. This feature advantageously limits the number of folder listing queries that must be made.

Remote cloud server 102 then supplies the identified folder metadata 316, along with a current state of global revision identifier 310, to local cloud server 104. The folder metadata 316 provided by remote cloud server 102 represents each folder that is currently part of the requested namespace view 315 in RFS 302. As part of this folder metadata 316, remote cloud server 102 returns the revision identifier stored in Revision_ID field 416 for each identified folder. The local cloud server 104 saves the current state of global revision identifier 310 and the folder metadata 316 in LFS 302.

Then, at (3), local cloud server 104 utilizes file listing queries to request file metadata 318 for at least some of the folders identified by folder metadata 316 returned by remote cloud server 102. For each folder identified in the folder metadata 316, local cloud server 104 compares the provided revision identifier of that folder on RFS with the prior revision identifier stored in Prior_Revision_ID field 524 of the corresponding folder record 502 in LFS metadata 304. If the Revision_ID 416 for an RFS folder is greater than the Prior_Revision_ID 524 for the LFS folder, local cloud server 104 knows that the folder on RFS has changed. As such, local cloud server generates a file listing query for that folder and provides it to remote cloud server 102. If however, the Revision_ID 416 for the RFS folder is the same as the Prior_Revision_ID 524 for the LFS folder, then local cloud server 104 knows that folder on RFS has not changed. As such, local cloud server 104 does not need to generate a file listing query for that folder, because the folder and its contents have not changed on RFS 302 and, therefore, the file metadata for that folder does not need to be transferred to local cloud server 104.

Local cloud server 104 performs the above process on a folder-by-folder basis for all paths contained in the returned folder metadata 316. Remote cloud server 102 receives each folder-specific file listing query, identifies its associated folder record 402, and then searches the records in files table 404 for file metadata 318 for files contained in that folder. Then at (4), remote cloud server 102 provides the file metadata 318 for the specified folder to local cloud server 104.

The folder metadata 316 and file metadata 318 represent limited RFS metadata snapshot 330 associated with RFS 302 that excludes metadata for file system objects in the requested namespace view 315 that have not changed since the last time the namespace view 315 was synchronized, Local cloud server 104 then, at (5), uses the limited RFS snapshot 330, a current LFS metadata snapshot 322, and the information in LVS database 328 to complete the FRS or LRS file system comparisons and to generate file system operations 324 and 326. Local cloud server 104 then, at (6), provides RFS operations 324 to remote cloud server 102 for application to RFS 302 there, as well as, applies LFS operations 326 to LFS 306. Application of RFS operations 324 and LFS operations 326 to RFS 302 and LFS 306, respectively, brings the portions (metadata and file data) of RFS 302 and LFS 306 associated with the requested namespace view 315 back into synchronization.

As portions of the subscribed namespace 204 are successfully synchronized between RFS 302 and LFS 306, local cloud server 104 again updates LVS database 328 as appropriate. Local cloud server 104 also updates the folder records 502 of LFS metadata 306 that were successfully synchronized. Assuming the FRS or LRS is successful, each folder record 502 associated with one of the folders that was fully resynchronized after a file listing query was made for it will have its Prior_Revision_ID field 524 updated to reflect the state of the global revision identifier 310 provided by remote cloud server 102. If there is an error with the FRS or LRS on some folder or associated file system object (e.g., a file in the folder), then the Prior_Revision_ID field 524 will not be updated in LFS metadata 304, to ensure that portion of the subscribed namespace 204 will be synchronized again in a later FRS or LRS.

Local cloud server 104 controls and coordinates the synchronization processes between local cloud server 104 and remote cloud server 102, and it can use the synchronization methods discussed above in a variety of ways. For example, the invention can be used to initially synchronize the subscribed namespace 204 between RFS 302 and LFS 306. After the initial synchronization, the invention facilitates re-synchronization of all or portions of the subscribed namespace, for example, at regular synchronization intervals. For example, the invention enables an FRS of the full subscribed namespace 204 to be repeatedly performed at regular, short intervals (e.g., every 5 minutes), because the invention can quickly identify and sync only the mutated data set. This mutated data set is typically very small for a short synchronization interval. Accordingly, the full subscribed namespace 204 can be regularly and repeatedly re-synchronized with RFS 302. Such repeated rescan synchronizations are not known to be possible in the prior art. As another example, an FRS or LRS can be quickly completed at the special request of local cloud server 104 or remote cloud server 102. This might occur when an FRS or LRS is triggered as part of another synchronization process (e.g., a steady state sync process) to resolve conflicts or due to uncertainties in the state of all or a portion of the subscribed namespace 204. Thus, rescan synchronizations are performed very quickly and efficiently, because metadata for the contents of folders that have not changed do not need to be provided to or evaluated again by local cloud server 104.

As still another example, the present invention can be used to ready a portion of subscribed namespace 204 for particular users. Typically, different users (e.g., local users 112, remote users 116, etc.) will be assigned permissions that allow them to access different parts of RFS 302 and LFS 306. For example, a local user 112 might only have permission to access the folder " . . . \Accounting\" 214 and its contents in subscribed namespace 204. The present invention, therefore, could be used to quickly resynchronize the "\Accounting\" folder on LFS 302 when that local user 112 logs in to provide the local user 112 an up-to-date piece of global namespace 204 that is specific to that user. Accordingly, the present invention can be used to "prime" subscribed namespace 204 for users based on those users' permissions. As yet another example, the present invention can be used to quickly and immediately re-synchronize the contents of a folder in subscribed namespace 204 at the explicit request of a user or system administrator. These and other advantages of the invention will be apparent from this disclosure.

As mentioned above, the prior revision identifiers 314(1-*n*) provided to remote cloud server 102 can provide important advantages. For example, remote cloud server 102 could receive the requested namespace view 315 and discover, based on a comparison of a prior revision identifier 314 and revision data (Revision_ID 416) for each folder in the requested namespace view 315, that none of the folders in the requested namespace view 315 have changed since their last synchronization. In such a case, remote cloud server 102 could notify local cloud server 104 that the requested namespace view 315 is already synchronized and then end the synchronization process without sending any, or very limited, folder metadata 316.

As yet another example, remote cloud server 102 could use the prior revision identifier(s) 314(1-*n*) of the requested namespace view 315 and a current state of the global revision identifier 310 to define one or more ranges of interest. In such a case, remote cloud server 102 could return folder metadata 316 only for a folder that corresponds to, or is a sub-folder of, a subscribed namespace identifier 312(1-*n*) and that has revision data (e.g., a revision state in Revision_ID field 416) that is greater than the prior revision identifier 314(1-*n*) provided for that subscribed namespace identifier 312(1-*n*) and less than the current state of global revision identifier 310. This process would provide an advantage, because the amount of folder metadata 316 provided to local cloud server 104 would be limited to particular folder records of the requested namespace view 315 that remote cloud server 102 knows have changed relative to the provided prior revision identifier(s) 314(1-*n*). Furthermore, in such an embodiment, local cloud server 104 would automatically know that it will need to obtain file metadata 318 for each folder identified in folder metadata 316, which would save the local cloud server 104 from having to perform the revision data comparison process described above. Accordingly, remote cloud server 102 could further provide the file metadata 318 automatically for any folder identified as having changed in folder metadata 316.

Figure 7:
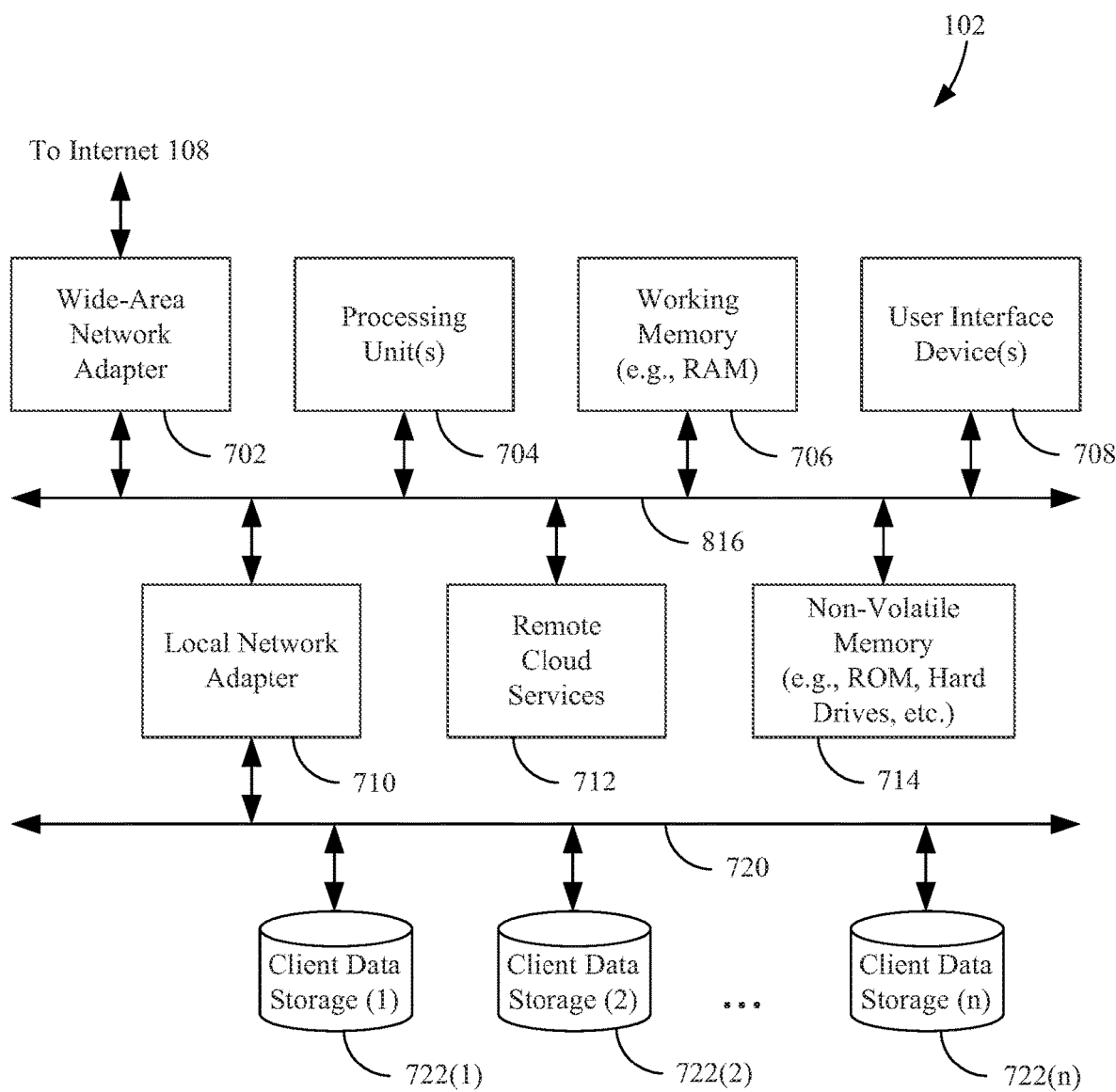
FIG. 7 is a block diagram of the remote cloud server of FIG. 1.

FIG. 7 is a block diagram of remote cloud server 102. Remote cloud server 102 includes a wide-area network adapter 702, one or more processing units 704, working memory 706, one or more user interface devices 708, a local network adapter 710, a remote cloud services component 712, and non-volatile memory 714, all intercommunicating via an internal bus 716. Processing units(s) 704 impart functionality to remote cloud server 102 by executing code stored in any or all of non-volatile memory 714, working memory 706, and remote cloud services 712. Remote cloud services 712 represents hardware, software, firmware, or some combination thereof, that provides the synchronization functionality described herein.

Wide area network adapter 702 provides a means for remote cloud server 102 to communicate with remote users 116, local cloud server 104, and local cloud server 106 via Internet 108. Local network adapter 710 provides a means for accessing a plurality of data storage devices 722(1-*n*), via a private network 720. Clients' files are stored in and retrieved from data storage devices 722(1-*n*) as needed. Additional data storage devices 722(*n*+) can be added as needed to provide additional storage capacity. In this example embodiment, data storage devices 722(1-*n*) are network attached storage (NAS) devices, but any suitable type of storage device can be used.

Cloud-based object storage infrastructures are further described in U.S. Publication No. 2014/0149794 A1, dated May 29, 2014 by Shetty et al. and entitled "System And Method Of Implementing An Object Storage Infrastructure For Cloud-Based Services", which is incorporated herein by reference in its entirety.

FIG. 8 is a relational diagram showing the functional aspects of remote cloud server 102 in greater detail. In the illustrated embodiment, the functional aspects are provided by remote cloud services 712 but could be distributed across other service modules or even other machines.

Remote user 116 is a device and/or process used to access the global namespace 200 of RFS 302 via an RFS handler 802. Remote user 116 can connect with RFS handler 802 either via the Internet 108 or via connection 118 (FIG. 1). RFS handler 802 represents an interface/protocol by which remote user 116 can access and modify RFS 302. For example, RFS handler 802 can implement HTTP, WebUI, WebDAV, RESTful application program interfaces (APIs) and/or FTP, an interface compatible with a mobile application (e.g., an application running on a smartphone, tablet, etc.), etc. Responsive to remote user 116, RFS handler 802 calls remote virtual file system (VFS) module 804.

Remote VFS module 804 provides remote user 116 with file and folder access to RFS 302. Remote VFS module 804 intercepts the file system calls coming from remote user 116 via RFS handler 802 and calls permissions enforcement module 806. Permissions enforcement module 806 enforces cloud permissions on the requested file system access utilizing permissions information stored in permissions database 808. Permissions enforcement module 806 and permissions database 808 are discussed only generally herein. However, permission management frameworks for cloud servers are described in detail in U.S. Publication No. 2014/0149461 A1, dated May 29, 2014 by Wijayaratne et al. and entitled "Flexible Permission Management Framework For Cloud Attached File Systems", which is incorporated herein by reference in its entirety.

In accordance with the user's permissions, remote VFS module 804 accesses RFS metadata 304 of RFS 302 to provide remote user 116 with a hierarchical virtual file system (e.g., a directory tree view of folders and files) of global namespace 200 either via the Internet 108 or via connection 118 (FIG. 1). The remote user 116 can then interact with the virtual file system and make changes to file system objects. When a data file needs to be uploaded to, downloaded from, or deleted from client data storage devices 722(1-n), remote VFS module 804 utilizes RFS object I/O module 810 to facilitate the data file transfer to or from client data storage 722(1-n).

RFS object I/O module 810 manages the I/O subsystem for organized data file storage and access on data storage devices 722(1-n). Responsive to YES module 804 and metadata 304, RFS object I/O module 810 downloads associated data files from, uploads associated data files to, and deletes associated data files from data storage devices 722 (1-n). I/O module 810 also provides and receives data files to and from YES module 804, which in turn, provides data files to, and retrieves data files from, remote user 116 as needed via RFS handler 802.

RFS 302 includes both the RFS metadata 304 and the data files stored on data storage devices 722(1-n). Metadata 304 is stored as described in FIG. 4 and describes a hierarchical, virtual file system that remote user 116 can access. Data storage devices 722(1-n) store data files that are associated with the virtual file system objects defined by the RFS metadata 304. RFS metadata 304 can also be stored in data storage devices 722(1-n) or non-volatile memory 714.

Remote cloud server 102 also defines and maintains global revision identifier 310 that changes in a predetermined way as alterations are made to global namespace 200. In the present embodiment, global revision identifier 310 is a long variable, but could be in other formats such as a date and time stamp, etc. In this embodiment, for each change remote VFS module 804 makes to global namespace 200 in accordance with user actions, remote VFS module 804 increments the current state of global revision identifier 310 to a new state and then updates the Revision_ID field 416 in the appropriate folder record(s) 402 of RFS metadata 304 based on the new state of the global revision identifier 310, as will be explained in further detail below.

Remote cloud server 102 also includes a remote synchronizer 812, which communicates with remote VS module 804 and with local cloud server 104 (or local cloud server 106) via a local cloud interface 814. Local cloud interface 814 is a means (e.g., network protocol(s), a set of APIs, etc.) by which remote cloud server 102 can intercommunicate with local cloud server 104 as needed. In a particular embodiment, local cloud interface 814 maintains an open (always on) connection with local cloud server 104 for efficient synchronization.

Remote synchronizer 812 controls and coordinates the various aspects of the synchronization process that remote cloud server 102 is responsible for between remote cloud server 102 and local cloud server 104. In particular, remote synchronizer 812 can receive commands from local cloud server 104 to initiate synchronization, for example, responsive to receiving one or more folder listing queries, including subscribed namespace identifiers 312(1-n) defining a requested namespace view 315, from the local cloud server 104. Remote synchronizer 812 is also operative to receive and store any prior revision identifiers(s) 314(1-n), and can provide the subscribed namespace identifier(s) 312(1-n) and prior revision identifier(s) 314(1-n) to remote VFS module 804 for further action.

Remote synchronizer 812 utilizes remote VFS module 804 to search the folder records 402 of RFS metadata 304 based on the subscribed namespace identifier(s) 312(1-n) and prior revision identifiers 314(1-n) provided by local cloud server 104. Remote VFS module 804 carries out the requested search of the RFS metadata 306 and returns folder metadata 316 for each folder of the requested namespace view 315. Remote synchronizer 812 provides the folder metadata 316 returned by remote VFS module 804 to local cloud server 104 along with the current state of global revision identifier 310. In the alternative embodiment discussed above where remote cloud server 102 makes a comparison of revision data, remote VFS module 804 can be configured to return and provide folder metadata 316 only for folders that have revision data (Revision_ID field 416) that is greater than an associated prior revision identifier 314(1-n).

If the synchronization is the initial synchronization of the subscribed namespace 204 (e.g., no prior revision identifier 314 provided for top-most folder 210), then VFS module 804 returns folder metadata 316 for the entire subscribed namespace 204 to remote synchronizer 812. Remote synchronizer 812 then provides this folder metadata 316 for each subscribed folder to local cloud server 104 along with the current state of global revision identifier 310.

Remote synchronizer 812 is also operative to receive file metadata queries from local cloud server 104 and, in response, instruct remote VFS module 804 to search RFS metadata database 304 for file metadata 318 associated with each file stored in a folder requested by local cloud server 104. In response, VFS module 804 performs the requested search of RFS metadata 304, and provides the returned file metadata 318 to remote synchronizer 812, which in turn, provides the file metadata 318 to local cloud server 104. Alternatively, remote synchronizer 812 can automatically cause the file metadata 318 to be retrieved and transferred to local cloud server 104 for each folder returned in folder metadata 316.

Remote synchronizer 812 also functions to receive and apply RFS operations 324 from local cloud server 104 via local cloud interface 814. When a stream of RFS operations 324 is received, remote synchronizer 812 provides the RFS operations 324 to RFS handler 802 (or alternatively directly to remote VFS module 804) so that they can be applied to RFS 302. RFS operations 324 can include any file system operations that are recognized by remote cloud server 102 and can include, but are not limited, upload, download, create, delete, update, etc. For example, RFS operations 324 can cause a file or folder to be created, deleted, etc. in RFS metadata 304. As another example, RFS operations 324 can result in a data file to be uploaded to, downloaded from, deleted from, updated, etc. in client data storage 722(1-n). Other RFS operations 324 (e.g., attribute modifications, etc.) can also be implemented as desired. In response to RFS operations 324, remote VFS module 804 determines and causes the necessary file system actions to be applied to RFS metadata 304 and/or client data storage 722(1-n) in accordance with the RFS operations 324 such that the associated portions of subscribed namespace 204 are synchronized with local cloud server 104.

When remote VFS module 804 receives actions on the global namespace 200 from a user that modifies RFS 302, remote VFS module 804 modifies RFS metadata 304, including updating Revision_ID field 416 in one or more folder records 402, as appropriate based on the user's actions. FIG. 9 shows a table 900 including a first column 902, identifying the file system actions made by a user on global namespace 200, and a second column 904 identifying the effects of such actions on the Revision_ID field 416 of the associated folder record(s) 402.

When a user adds a file to RFS 302 (and therefore global namespace 200), remote VFS module 804 creates a new file record in Files table 404 and fills the fields 418-434. Additionally, remote VFS module 804 increments global revision identifier 310 to a new state and then stores the new state in the Revision_ID field 416 of the folder record 402 associated with the folder in which the file was created in (see column 904). Storing the new state overwrites an older revision state stored in Revision_ID field 416.

When a user adds a folder to RFS 302, remote VFS module 804 creates a new folder record in Folders table 402 and fills the other metadata fields as appropriately. Additionally, remote VFS module 804 increments global revision identifier 310 to a new state and then stores the new state in Revision_ID field 416 of the new folder record 406.

When a user copies a file within RFS 302, remote VFS module 804 creates a new file record 418 in Files table 404 for the target file and fills the appropriate metadata 618-634. Additionally, remote VFS module 804 increments global revision identifier 310 to a new state and then stores the new state in Revision_ID field 416 of the folder record containing the target file.

When a user copies one or more folder(s) within RFS 302, remote VFS module 804 creates one or more new folder record(s) in Folders table 402 for the target folder hierarchy and fills the other metadata fields in each new folder record. New file record(s) might also be created in table 404 for any files in the copied folders. Additionally, remote VFS module 804 increments global revision identifier 310 to a new state and then stores the new state in the Revision_ID field 416 of each new folder record 402 created in the target folder hierarchy, including the topmost target folder record.

When the metadata of a file changes (e.g., when a user changes the file name, if the checksum 430 changes, etc.), remote VFS module 804 modifies the metadata in the associated file record in Files table 404. Additionally, remote VFS module 804 increments global revision identifier 310 to a new state and then updates the Revision_ID field 416 of the folder record 606 of the folder containing the file with the new state.

When a user moves a file within RFS 302, remote VFS module 804 modifies the associated file record accordingly (e.g., updates the folder ID field 420). Additionally, remote VFS module 804 increments global revision identifier 310 to a new state and then updates the Revision_ID field 416 of the source and target folder records 402 associated with the file move with the new state.

When a user moves a folder within RFS 302, remote VFS module 804 modifies the metadata e.g., canonical path 408, parent ID 412, etc.) in the folder record(s) in Folders table 402 that are associated with the moved (target) folder hierarchy. Additionally, remote VFS module 804 increments global revision identifier 310 to a new state and then updates the Revision_ID field 416 of each folder record of the target folder hierarchy, including the topmost target folder, with the new state.

When a user removes a file from RFS 302, remote VFS module 804 updates the associated file record in Files table 404 to indicate the file is deleted (e.g., moves the file to a trash table (not shown), updates status field 442 such that the file record will be moved to a trash table, etc.). Additionally, remote VFS module 804 increments global revision identifier 310 to a new state and then stores the new state of the global revision identifier 310 in Revision_ID field 416 of the folder record 402 of the folder containing the deleted file.

When a user removes a folder from RFS 302, remote VFS module 804 updates the associated folder record in Folders table 402 to indicate the folder is deleted (e.g., updates the path field 408 with a trash folder path, moves the folder record to a trash table lot shown), etc.). Otherwise, remote VFS module 804 takes no action with respect to Revision_ID field 416 of the folder record associated with the deleted folder. This is because the folder ceases to exist in the global namespace 200. Notice of this folder's deletion will be propagated to local cloud server 104, for example, when local cloud server 104 pulls a new folder listing where the (previously-synchronized) deleted folder is now absent. This is also the reason why the revision identifier of a source folder does not need to be updated when a folder is moved from it. Notice could also be provided to the local cloud via a steady-state event synchronization process such as that described in U.S. Pub. No. 2014/0040196 A1, dated Feb. 6, 2014 by Wijayaratne et al. and entitled "System and Method for Event-Based Synchronization of Remote and Local File Systems", which is incorporated by reference herein in its entirety.

When a user restores one or more folder(s and/or file(s) to RFS 302 from the trash, remote VFS module 804 updates the associated folder record(s) and file record(s) (e.g., returns them to Folders table 402 and Files table 404 from respective trash tables, etc.). Additionally, for a folder restore, remote VFS module 804 increments global revision identifier 310 to a new state and then stores the new state in the Revision_ID field 416 of each folder record of the restored folder hierarchy. For synchronization purposes, these restored folder records represent the folders that may have different contents from subscribed namespace on LFS 306. In the case of a trash restore or a version restore of a file, remote VFS module 804 increments global revision identifier 310 to a new state and then stores the new state in the Revision_ID field 416 of the folder record of the folder containing the restored or reverted file.

Figure 10:
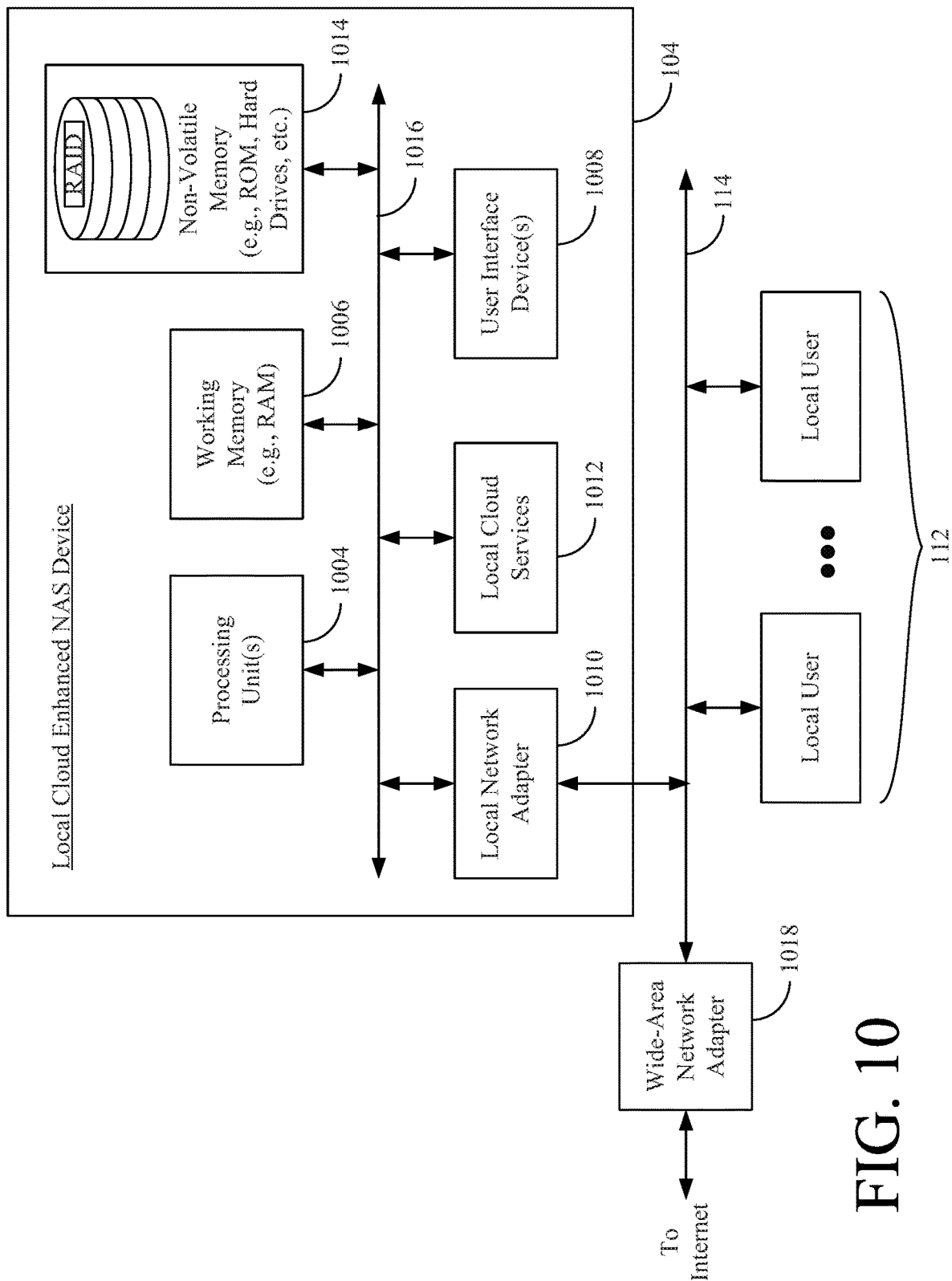
FIG. 10 is a block diagram of the local cloud server of FIG. 1.

In summary, each action described in FIG. 10 is associated with one or more "events" that occur to RFS 302. Folders affected by an action have their associated folder records marked with a new state of global revision identifier 310, which is incremented in response to the action occurring. As an alternative, the folder records could be updated with the current state of the global revision identifier 310 and global revision identifier 310 could then be incremented to a new state to use for the next action. The achieved result would be the same in either case, depending on the starting value of the global revision identifier 310. Additionally, because each action to RFS 302 denotes an event, the revision identifier can also be used as an event identifier and defines a point in time in the event stream for a domain. Because of these properties, global revision identifier 310 can also be used to version folders.

FIG. 10 is a block diagram showing local cloud server 104 in greater detail. (Note the elements of FIG. 10 apply equally to local cloud server 106.) In this particular embodiment, local cloud server 104 is an enhanced network attached storage (NAS) device that includes one or more processing units 1004, working memory 1006, one or more user interface devices 1008, a local network adapter 1010, a local cloud services component 1012, and non-volatile memory 1014, all intercommunicating via an internal bus 1016. Processing units(s) 1004 impart functionality to local cloud server 104 by executing code stored in any or all of non-volatile memory 1014, working memory 1006, and local cloud services 1012. A wide-area network adapter 1018 facilitates communication with remote cloud server 102 via local network 114 and the Internet 108.

Non-volatile memory 1014 also provides local file storage for client files/objects. By way of example, the nonvolatile memory 1014 is shown to include (in addition to other types of memory) a set of hard drives arranged in a RAID configuration. The client's file system on the RAID drives can be accessed by local users 112 via local network 114, as is known in the art.

Local cloud services 1012 represents hardware, software, firmware, or some combination thereof, that provides the synchronization functionality described herein. Local cloud services 1012 also provide file storage and retrieval services to local users 112. The file storage functionality of local cloud services 1012 will not be described in detail herein, except to the extent it relates to the synchronization aspects, so as not to unnecessarily complicate this disclosure.

Figure 11:
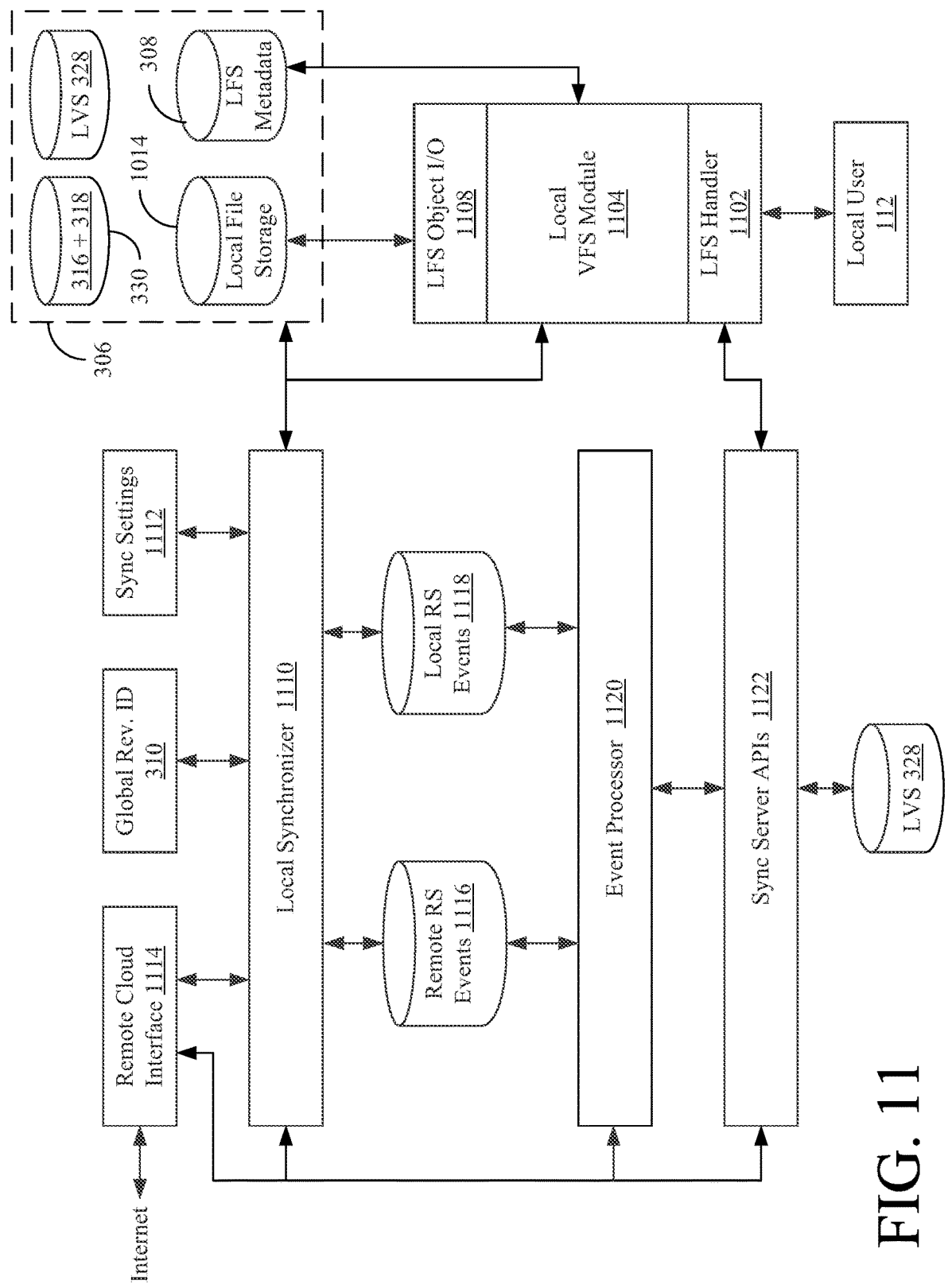
FIG. 11 is a relational diagram showing the functional aspects of the local cloud server of FIG. 10.

FIG. 11 is a relational diagram of the functional aspects of local cloud server 104 or, alternatively, local cloud server 106 in greater detail. In this illustrated embodiment, the functional aspects are provided by local cloud services 1012 but can be distributed across other service modules or even other machines.

LFS handler 1102 receives requests for access (e.g., logins, read requests, write requests, etc.) from local users 112. In this particular example, local users 112 are WINDOWS® clients, and LFS handler 1102 includes a server application implementing Samba, which allows local cloud server 104 to interact with the local users 112. Local user 112 includes a device/process used to access the objects in LFS 306 that are hosted by local cloud server 104, including the synchronized files associated with subscribed namespace 204. A user maps the "share" that is exported, in accordance with the user's permissions, by LFS handler 1102 (e.g., via Common Internet File System (CIFS), SMB, etc.) and then accesses the files and folders within the exported share.

A local VFS module 1104 monitors the actions of local user 112 to detect changes being made to LFS 306 by local user 112. When local VFS module 1104 detects a change to LFS 306, local VFS module 1104 modifies the LFS metadata 308 to record the change. LFS object I/O module 1108 manages the I/O subsystem for organized storage and access of data files stored in local file storage 1014 on LFS 306. Local VFS module 1104 conveys data objects between LFS handler 1102 and LFS Object I/O module 1108 when data files need to be transferred between local file storage system 1014 and local user 112.

A local synchronizer 1110 is responsible for driving the synchronization processes on local cloud server 104. Synchronization settings 1112 are configuration settings that define the subscribed namespace 204 associated with local cloud server 104 and optionally define a synchronization interval (e.g., every 3 hours, every 30 minutes, every 5 minutes, etc.) which triggers local synchronizer 1110 to resynchronize all of, or particular portions of, subscribed namespace 204. In this embodiment, synchronization settings 1112, including subscribed namespace. 204, are determined when service begins with remote cloud server 102 and can be updated (e.g., to redefine subscribed namespace 204) by an administrator as desired.

Local synchronizer 1110 can also be triggered into initiating a rescan synchronization for various other reasons. For example, local cloud server 104 might implement a second type of synchronization process (e.g., steady-state synchronization (SSS), etc.) in addition to rescan synchronization. The second synchronization process might trigger an FRS or LRS if the it crashes, experiences conflicts, etc. Other types of synchronization processes are described in U.S. Pub. No. 2014/0040196 A1, dated Feb. 6, 2014 by Wijayaratne et al. and entitled "System and Method for Event-Based Synchronization of Remote and Local File Systems", which is incorporated by reference herein in its entirety. Another event-based synchronization system and method is described in U.S. Pub. No. 2016/0019233 A1, published Jan. 21, 2016 by Wijayaratne et al. and entitled "System And Method For Policy Based Synchronization Of Remote And Local File Systems", which is also incorporated by reference herein in its entirety.

Local synchronizer 1110 initializes synchronization by establishing a connection (if none already exists) with remote cloud server 102 via a remote cloud interface 1114. Local synchronizer 1110 communicates with remote cloud server 102 via APIs and is operative to query remote cloud 102 with one or more subscribed namespace identifier(s) 312(1-n), corresponding to a requested namespace view 315 that it wishes to synchronize. Local synchronizer 1110 is also operative to query remote cloud server 102 with prior revision identifier(s) 314 if one or more have been previously stored. Local synchronizer 1110 obtains the subscribed namespace identifier(s) 312(1-n) and prior revision identifier(s) 314(1-n) by retrieving the data from the folder records 502 of LFS metadata 308 (e.g., the data in canonical path field 508, prior revision identifier 524, etc.).

In response to each folder listing query and subscribed namespace identifier 312 from local synchronizer 1110, remote cloud server 102 returns the folder metadata 316 for all folders of RFS 302 that are part of the requested namespace view 315, along with the current state of global revision identifier 310, to local cloud server 104. The returned folder metadata 316 includes a revision identifier (the revision state contained in Revision II) 416 field) for each folder identified therein. Local synchronizer 1110 receives and stores the current global revision identifier 310. Local synchronizer 1110 also stores each of the records returned in the folder metadata 316 as part of a RFS metadata snapshot 320 or limited RFS metadata snapshot 330 in LFS 306.

Subsequently, local synchronizer 1110 determines which folders identified in the folder metadata 316 have changed since they were last synchronized. Local synchronizer 1110 accomplishes this by, for each folder identified in folder metadata 316, comparing a revision identifier returned for that folder with a prior revision identifier (Prior_Revision_ID field 524) stored for that folder in LFS 306. If this comparison reveals that a folder has been modified (e.g., if the revision state of the folder in RFS 302 is greater than prior revision state of the folder in LFS 306), then local synchronizer 1110 makes a file listing query for file metadata 318 contained in that folder. In contrast, if the comparison reveals that the folder has not changed (e.g., if the revision state of the folder in RFS 302 is the same as the prior revision state of the folder in LFS 306), then local synchronizer 1110 does not make a file listing query for that folder and does not download file metadata 318 for that folder. In this embodiment, local synchronizer 1110 requests file metadata 318 on a folder-by-folder as indicated above. When the file metadata 318 is received, local synchronizer 1110 stores the file metadata 318 as part of RFS metadata snapshot 320 or limited RFS metadata snapshot 330. The RFS metadata snapshot 320 and limited RFS metadata snapshot 330 can be partitioned by folder and file similar to RFS metadata 304 for efficient searching.

An exemplary folder listing API employed by local synchronizer 1110 according to the present invention will now be discussed. The folder listing API obtains and outputs the folder metadata 316 for each folder of RFS 302 that is part of the requested namespace view 315 defined by the subscribed namespace identifiers 312(1-n). The returned list of folders can be acquired and/or filtered based on the permissions net in the remote cloud 102. (In the alternative embodiments discussed above where remote cloud server 102 makes a comparison of the RFS folder revision data and the prior revision identifier(s) 314(1-n), the folder listing output would only list folders that might have changed since their last synchronizations).

Initially, local synchronizer 1110 sends one or more folder listing queries to remote cloud server 102. Each folder listing query includes a subscribed namespace identifiers 312, which identifies a folder of interest in subscribed namespace 204 (e.g., by the path in canonical path field 508 of the folder record of interest). Each folder listing query can also include a prior revision identifier 314 (if available) corresponding to the prior state of global revision identifier 310 stored for the folder of interest in Prior_Revision_ID field 524.

Each folder listing query results in the output shown below. The "#start_folder_meta" and "#start_folder_list" are different sections of the data returned by remote cloud 102.

```
#start_folder_meta
    #start_folder_list
    Folder_ID1\tCanonical_Path1\tLstmtime1\tRevision_ID1\n
    Folder_ID2\tCanonical_Path2\tLstmtime2\tRevision_ID2\n
    ...
    #end_folder_list
global_rev_id\t100\n
#end_folder_meta
```

The #start_fold_list section of the output lists folders and associated metadata for each folder in RFS 302 on remote cloud server 102 that corresponds to the folder identified by the subscribed namespace identifier 312 or is one of its sub-folders. The metadata returned for each folder includes, but is not limited to, the metadata in Folder ID field 406, Canonical_Path 408, Lstmtime field 414, and Revision_ID field 416 of each associated folder record 402. Local synchronizer 1110 saves the returned list of folders and associated folder metadata 316 in LFS 306 as part of RFS metadata snapshot 320 or limited RFS metadata snapshot 330. Here, the amount of returned folder metadata for each folder is limited to conserve bandwidth.

The #start_folder_meta section of the output returns the current state (e.g., "100") of global revision identifier 310 as seen on the remote cloud server 102 and defines a tab spacing ("\t") in the output. Thereafter, the folder listing API ends and local synchronizer 1110 saves the provided state of the global revision identifier 310 for updating Prior_Revision_ID fields 524 of the synchronized folders in LFS 306 when synchronization is complete. The output of the folder listing query is provided in flat-file format. Each "\t" in the listing translates to a tab in the output, whereas each "\n" translates to a new line in the output.

For an initial synchronization or an FRS, local synchronizer 1110 can make a folder listing query for "Chicago_Domain" folder 210. In response, remote cloud server 102 provides a folder listing consisting of the identified folder 210 as well as each of its sub-folders. Folder 210 is the top-most folder in the hierarchy of subscribed namespace 204, and therefore, providing its path is an efficient means by which to obtain a folder listing of the entire subscribed namespace 204. If there are multiple top-level folders in the subscribed namespace, then local synchronizer 1110 would make a folder listing query that includes all top-level folders.

For an LRS, a folder listing query can be defined and made for each folder of interest by local synchronizer 1110. For example, an LRS of folders 216 and 220 in subscribed namespace 204 might be needed. Accordingly, local synchronizer 1110 can make a first folder listing query for folder 216 comprising a subscribed namespace identifier 312(1) including the path " . . . /chicago_domain/accounting/billing/" from Canonical Path field 508 of the corresponding record 502 and a prior revision identifier 314(1) stored in Prior_Revision_LID field 524 of the same folder record 502. A second folder listing query could be made for folder 220 comprising a subscribed namespace identifier 312(2) including the path " . . . /chicago_domain/us_teams/" from Canonical Path field 508 of the corresponding record 502 and a prior revision identifier 314(2) from Prior_Revision_ID field 524 of the same folder record 502. Note the prior revision identifiers 314(1-2) might be different, depending on when the folders 214 and 220 were last synchronized.

Subscribed namespace identifiers 312 that identify lower folders e.g., folder 216, folder 220, etc.) in subscribed namespace 204 will also cause those lower folders to be treated as the top folder for that query. Accordingly, remote cloud server 102 will return folder metadata 316 for the requested folder and any sub-folders. This method of returning a listing of all sub-folders of a requested folder conserves bandwidth during the folder listing query.

An exemplary file listing API employed by the present invention will now be discussed. Based on the folders returned by the folder listing API and, in particular embodiments, a comparison of their revision identifiers with the prior revision identifiers for those folders stored in LFS metadata 308, the local synchronizer 1110 is able to identify the folders that have changed, and then obtain the file metadata 318 for files in those folders. Accordingly, local synchronizer 1110 makes file listing calls to remote cloud 102 based on the folders returned by the folder listing API. Remote cloud server 102 responds with the following output for the file listing API.

```
#start_file_list
    #start_folder_file_meta
        folder_path\tstatus_code\tnum_files\tlatest_mtime\n
        File_ID1\t\Name1\tLstmtime1\tSize1\tChecksum1\n
        File_ID2\t\Name2\tLstmtime2\tSize2\tChecksum2\n
        ...
    #end_folder_file_meta
    #start_folder_file_meta
    ...
    #end_folder_file_meta
    #start_unprocessed_query_folders
        folder_path_1
        folder_path_2
    #end_unprocessed_query_folders
#end_file_list
```

For each folder path provided, the query returns some additional RFS metadata for that folder followed by a list of files and metadata for those files stored within each requested folder. The metadata returned for the requested folder includes the folder's canonical) path, a status code ("status_code"), the number of files ("num_files") contained in the folder to be listed, and the last time the folder was modified. The status code is used by remote cloud server 102 to indicate the status of the folder (e.g., if it is still available, if access is authorized, etc.). The metadata returned for each file in the requested folder can include, but is not limited to, the information in File ID field 418, Name field 424, Lstmtime field 428, Size field 432, and Checksum field 430 from the file records 404 of RFS metadata 304.

The output for each returned folder is delineated by "#start_folder_file_meta" and "#end_folder_file_meta" and is provided in flat-file format. As before, "\t" translates to a tab in the output and "\n" translates to a new line.

The output for #start_unprocessed_query_folders indicates any requested folders that remote cloud server 102 could not process for file list output, for example, due to temporary capacity issues. Local synchronizer 1110 could make note of these paths and take appropriate action (e.g., logging the unprocessed folders, making a new file listing request for the unprocessed folders, not updating the prior revision identifier 524 for those folders so they will synchronized again in the future, etc.)

Together, the folder metadata 316 and file metadata 318 returned by remote cloud server 102 form a limited RFS snapshot 330 in the case of a rescan synchronization. Local synchronizer 1110 compares the data in limited RFS snapshot 330, the data in an LFS metadata snapshot 322 of the corresponding portions of LFS metadata 304, and the data in LVS database 328 to determined differences between the subscribed namespace on RFS 302 and LFS 306. Based on these differences, local synchronizer 1110 determines and stores records of remote RS events and local RS events in a remote RS events database 1116 and a local RS events database 1118, respectively. Remote RS events correspond to changes made to RFS 302 since the last synchronization, whereas local RS events 1118 correspond to changes made to LFS 306 since the last synchronization.

Local synchronizer 1110 is also configured to instruct an event processor 1120 to begin processing the remote and local RS event records in databases 1116 and 1118. Event processor 1120 consumes the remote and local RS event records in databases 1116 and 1118 and generates RFS operations 324 and LFS operations 326 based on the RS events that are needed to synchronize the requested namespace view 315 of associated with the synchronization. Event processor 1120 outputs the operations to sync server APIs 1122, which in turn cause the operations to be applied to LFS 306 or RFS 302.

As the file system operations 324 and 326 are applied, portions of RFS 302 and LFS 306 become synchronized. As each folder and its contents are fully synchronized, local synchronizer 1110 updates (overwrites) the Prior_Revision_ID field 524 for that folder in metadata 308 with the state of global revision identifier 310 provided by remote cloud server 102 in response to the folder listing query.

The invention provides advantages as described above because the mutated portions of the requested namespace view 315 on remote cloud server 102 can be quickly identified and downloaded to local cloud server 104, while un-altered portions of the requested namespace view 315 can be excluded. This conserves processor and memory resources on the remote and local cloud servers, as well as transmission time and bandwidth. The downloaded folder and file information can then be compared with corresponding LFS metadata 308 to synchronize the namespaces and associated file data. The invention can also provide an advantage by complementing or replacing the snapshot-based "rescan synchronization" processes in the cloud-based applications as described above.

Figure 12B:
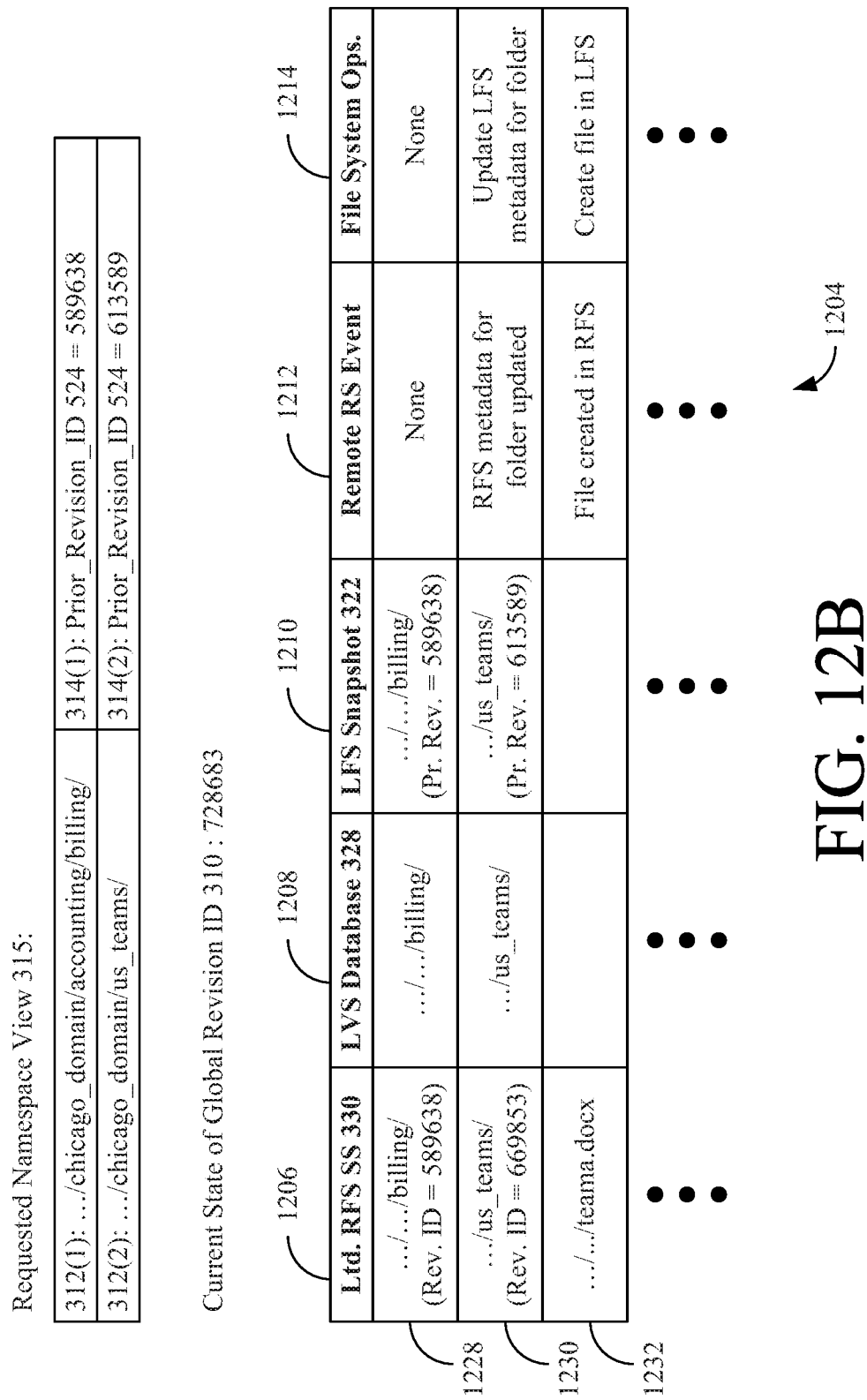
FIG. 12B shows a table illustrating part of a limited rescan synchronization (LRS) according to the present invention.

Each of FIGS. 12A and 12B contains a table summarizing how the invention provides advantages when performing a rescan synchronization. Table 1202 of FIG. 12A illustrates a full rescan synchronization (FRS), whereas table 1204 of FIG. 12B illustrates a limited rescan synchronization (LRS).

In FIG. 12A, the namespace view 315 requested by local cloud server 104 for synchronization is defined by subscribed namespace identifier 312(1). Subscribed namespace identifier 312(1) identifies the canonical path of "/chicago_domain/" folder 210. Additionally, local cloud server 104 has provided a prior revision identifier 314(1) for the folder 210, which corresponds to the revision identifier stored in Prior_Revision_ID field 524 of the associated folder record 502 in LFS metadata 308. In this case, the prior revision identifier is 357899 and represents the state of global revision identifier 310 the last time folder 210 was synchronized. Folder 210 is the top-most folder in subscribed namespace 204 and, therefore, folder 210 and each sub-folder in subscribed namespace 204 will be re-synchronized in an FRS. However, table 1202 shows only a small portion of the subscribed namespace 204.

After submitting a folder listing query and the requested namespace view 315, remote cloud server 102 returns the current state of its global revision identifier 510 (589638 in this example) along with folder metadata 316 and file metadata 318, as discussed above. This folder metadata 316 and file metadata 318 defines the limited RFS snapshot 330, a portion of which is shown in a first column 1206 of table 1202. The paths contained in LVS database 328 and LFS snapshot 322 (if any) are shown in second and third columns 1208 and 1210, respectively. During the FRS, the data in the first three columns 1206, 1208, and 1210 is compared by local synchronizer 1110, which generates records of determined remote RS events and local RS events (not shown) and stores them in databases 1116 and 1118, respectively. A fourth column 1212 shows the remote events determined by local synchronizer 1110 based on its comparison of the first through third columns 1206-1210. Finally, a fifth column 1214 indicates file system operations that will be applied in this example based on the remote RS events in column 1212.

Because the top-most folder 210 ("/chicago_domain/") was requested as part of this FRS, limited RFS snapshot 330 includes a listing of each folder in subscribed namespace 204. In a first row 1216 of table 1202, a comparison between columns 1206 and 1210 indicates that folder 210 has not changed in RFS 302 since it was last synchronized with LFS 306. This is because the last revision state (357899) of folder 210 on RFS 302 is the same as the prior revision state (357899) on LFS 306. Accordingly, limited RFS snapshot 330 does not include a file listing for folder 210 and, in this example, no file system operations are generated to synchronize folder 210. (Note, however, that if folder 210 were changed in LFS 306, then resynchronization folder 210 might still occur due to the changes in LFS 306.)

In a second row 1218, a comparison between columns 1206 and 1210 indicates that the revision state of " . . . /accounting/" folder 214 has changed in RFS 302, because its last revision state (495632) on RFS 302 is greater than the prior revision state (396658) on LFS 306. Accordingly, a remote RS event and associated file system operations will be generated to resynchronize the metadata associated with folder 214 in RFS 302 and LFS 306. Additionally, because folder 214 is associated with a file system change, limited RFS snapshot 330 includes a file listing for folder 214, which in this example is represented as file 222 ("revenue.xlsx").

In a third row 1220 of column 1206, no RFS metadata 316 is provided in limited RFS snapshot 330 for folder 218, indicating that folder 218 was deleted from RFS 302. Because folder 218 use to be present in RFS 302, as determined by a comparison with the entries in LVS database 328 and RFS snapshot 322, file system operations are generated to delete folder 218 from LFS 302.

In a fourth row 1222, RFS metadata is provided for folder 216. However, a corresponding path does not exist in LVS database 328 or LFS snapshot 322. Accordingly, local synchronizer 1110 determines that folder 216 was created in RFS 302 and creates a corresponding RS remote event in remote RS events database 1116. When this remote RS event is processed, LFS operations 326 will be generated to create a corresponding folder in LFS 306 and LVS database 328 will be updated to reflect the synchronized folder 216. Because folder 216 needs to be synchronized, limited RFS snapshot 330 will also include a file listing (not shown) for the files contained in folder 216.

In a fifth row 1224 of table 1202, a comparison ween columns 1206 and 1210 indicates that the revision state of folder 220 (" . . . /us_teams") has not changed in RFS 302 since folder 220 was last fully synchronized with LFS 306, because its last revision state (512375) on RFS 302 is the same as its prior revision state (512375) on LFS 306. Thus, folder 220 does not need to be resynchronized. Accordingly, limited RFS snapshot 330 does not include a file listing for folder 220.

Limited RFS snapshot 330 also includes file metadata 318 for files in the returned folder paths in limited RFS snapshot 330 that are determined to have changed. Accordingly, limited RFS snapshot 330 will include file metadata 318 for each file in folders 214 and 216. However, no file metadata 318 is included in limited RFS snapshot 330 for folders 210 and 220, because these folders (or the files contained therein) did not mutate since their last synchronization. Accordingly, this illustrates how limited RFS snapshot 330 can be much smaller and can conserve bandwidth and system resources over prior art rescan techniques.

A sixth row 1226 shows file metadata 318 for a "revenue.xlsx" file 222 stored in "accounting" folder 214. While it is expected that limited RFS snapshot 330 would contain metadata 318 for many files, only this one example is shown in FIG. 12A for simplicity. As illustrated by columns 1206, 1208, and 1210, an entry for file 222 is not contained in LVS database 328 or LFS snapshot 322 and, therefore, local synchronizer 1110 determines that the file 222 was created in RFS 302 since the "accounting" folder 214 was last synchronized. Accordingly, local synchronizer 1110 records a remote RS event in database 1116 such that file system operations will be generated and applied to create a corresponding file in LFS 306.

It should be noted that the above description discusses changes made to the subscribed namespace 204 from the point of view of RFS 302. Other changes may have been made to LFS 306 and, accordingly, local synchronizer 1110 would also generate and record local RS events in local RS events database 1118 to ensure that the changes to the version of subscribed namespace 204 on LFS 306 were also propagated to RFS 302.

Additionally, when a folder is successfully synchronized, local synchronizer 1110 records the state (589638) of the global revision identifier 310 in the Prior_Revision_ID field 524 of the corresponding folder record 502 in LFS metadata 508. In the example FRS in FIG. 12A, the state 589638 will be stored in field 524 of the folder record 502 for each of folders 214 and 216. Storing this prior revision identifier indicates that the associated folders and their file contents were synchronized with RFS 302 as of the time the global revision identifier 310 on remote cloud server 102 had the state/value of 589638.

Table 1204 of FIG. 12B illustrates an exemplary limited rescan synchronization (LRS) according to the invention that occurs at some time after the FRS described in FIG. 12A. For a LRS, local synchronizer 1110 requests synchronization of only limited portions of the subscribed namespace 204. In the example shown in FIG. 12B, the namespace view 315 requested by local synchronizer 1110 for synchronization is defined by subscribed namespace identifier 312(1) and subscribed namespace identifier 312(2). Subscribed namespace identifier 312(1) identifies the canonical path for folder 216 (" . . . /billing/") of subscribed namespace 204. Local synchronizer 1110 also supplies the prior revision identifier 314(1) for the folder 216 from Prior_Revision_ID field 524 of the corresponding folder record 502 of LFS metadata 308. Here, the prior revision identifier 314(1) is 589638, which is the state corresponding with the last FRS in FIG. 12A.

The namespace view requested by local synchronizer 1110 also includes the canonical path for folder 220 (" . . . /us_teams/") of subscribed namespace 204, as identified by subscribed namespace identifier 312(2) along with the associated prior revision identifier 314(2) from Prior_Revision_ID field 524 of the corresponding folder record 502. Here, the prior revision identifier 314(2) corresponds to a state of 613589, which means that folder 220 was synchronized at some time between the FRS described in FIG. 12A and the current LRS.

After submitting the folder listing queries with the requested namespace view 315, remote cloud server 102 returns the current state of its global revision identifier 510 (728683 in this example) along with folder metadata 316 and file metadata 318 for the mutated portions of RFS metadata 304 associated with the requested namespace view 315. This folder metadata 316 and file metadata 318 defines the limited RFS snapshot 330, a portion of which is shown in a first column 1206 of table 1204. The contents of LVS database 328 and LFS snapshot 322 are again shown in second and third columns 1208 and 1210, respectively.

Limited RFS snapshot 330 includes metadata 316 for path "/chicago_domain/billing/" (folder 216) and for path "/chicago_domain/us_teams/" (folder 220). Limited RFS snapshot 330 would also contain folder metadata 316 for any sub-folders of folders 216 and 220 that may have mutated since the last synchronization.

In a first row 1228 of table 1204, a comparison between columns 1206 and 1210 indicates that the revision state of folder 216 has not changed in RFS 302 since the last FRS, because the revision state (589638) of folder 216 on RFS 302 is the same as the prior revision state (589638) on LFS 306. Accordingly, folder 216 is not resynchronized, and limited RFS snapshot 330 does not include a file listing for folder 216.

In a second row 1230, the comparison between columns 1206 and 1210 indicates that folder 220 has changed, because the revision identifier (669853) associated with folder 220 in RFS 302 is greater than the prior revision identifier (613589) for folder 220 on LFS 306. Accordingly, local synchronizer 1110 records this remote RS event and generates file system operations to synchronize the metadata for folder 220 on RFS 302 and LFS 306. Because folder 220 has mutated since its last synchronization, limited RFS snapshot 330 will also include file metadata 318 for each file stored in folder 220.

A third row 1232 of column 1206 shows file metadata 318 for a "teama.docx" file 224 stored in "/us_teams/" folder 220. While it is expected that limited RFS snapshot 330 would contain metadata 318 for many files associated with the returned folder list, only this one example is shown in FIG. 12B for simplicity. As illustrated by columns 1206, 1208, and 1210, an entry for file 224 is not contained in LVS database 328 or LFS snapshot 322 and, therefore, local synchronizer 1110 determines that the file 224 was created in RFS 302 since folder 220 was last synchronized. (File 224 is therefore shown dashed in FIG. 2.) Accordingly, local synchronizer 1110 records a remote RS event that file 224 was created in RFS 302 such that file system operations will be generated and applied to create a corresponding file in LFS 306.

When a folder is successfully synchronized, local synchronizer 1110 records the state of the global revision identifier 310 in the Prior_Revision_ID field 524 of the associated folder record 502 in LFS metadata 308. In this example, the state 728683 will be stored in field 524 of the folder record 502, which indicates that folder 220 and its contents were synchronized on RFS 302 and LFS 306 as of the time the global revision identifier 310 had the state/value of 728683.

Some methods of the invention will now be described with reference to FIGS. 13-17. For the sake of clear explanation, these methods might be described with reference to particular elements discussed herein that perform particular functions. However, it should be noted that other elements, whether explicitly described herein or created in view of the present disclosure, could be substituted for those cited without departing from the scope of the present invention. Therefore, it should be understood that the methods of the present invention are not limited to any particular element(s) that perform(s) any particular function(s). Further, some steps of the methods presented need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figure 13:
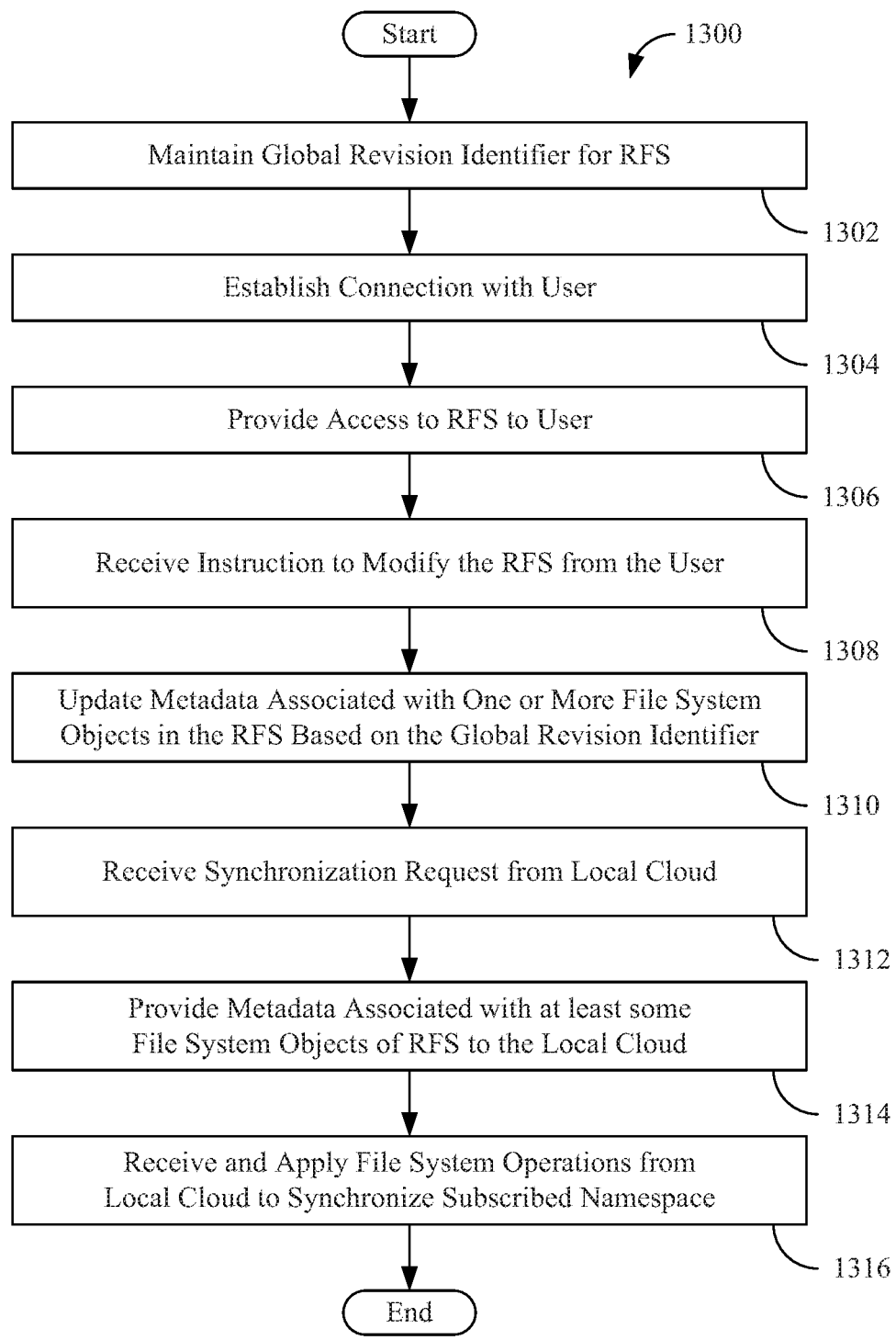
FIG. 13 is a flowchart summarizing one method of facilitating synchronization of remote and local file systems according to the present invention.

FIG. 13 is a flowchart summarizing a method 1300, in a remote cloud server 102, for facilitating synchronization of a subscribed namespace 204 between an RFS 302 and an LFS 304. In a first step 1302, the remote cloud server 102 maintains a global revision identifier 310 associated with the RFS 302, where the global revision identifier 310 has a variable state. In a second step 1304, remote cloud server 102 establishes a connection with a user e.g., remote user 116) and, in a third step 1306, provides access to RFS 302 to the user. In a fourth step 1308, remote cloud server 102 receives instruction(s) from the user to modify a portion of the subscribed namespace 204 on the RFS 302. Responsive to RFS 302 being modified, in a fifth step 1310, a remote synchronizer 812 of remote cloud server 102 updates metadata associated with one or more of the file system objects in the RFS 302 based on a state of the global revision identifier 310. In a particular method, the Revision_ID field 416 of folder metadata record(s) 502 is updated according to table 900 shown in FIG. 9, depending on the modification made to RFS 302. In a sixth step 1312, remote cloud server 102 receives a synchronization request from local cloud server 104, and in a seventh step 1314, remote synchronizer 812 provides metadata associated with at least some of the file system objects of RFS 302 to the local cloud server 104. In an eighth step 1316, remote synchronizer 812 receives file system operations from local cloud server 104 and applies them to RFS 302 to synchronize portions of subscribed namespace 204.

Figure 14:
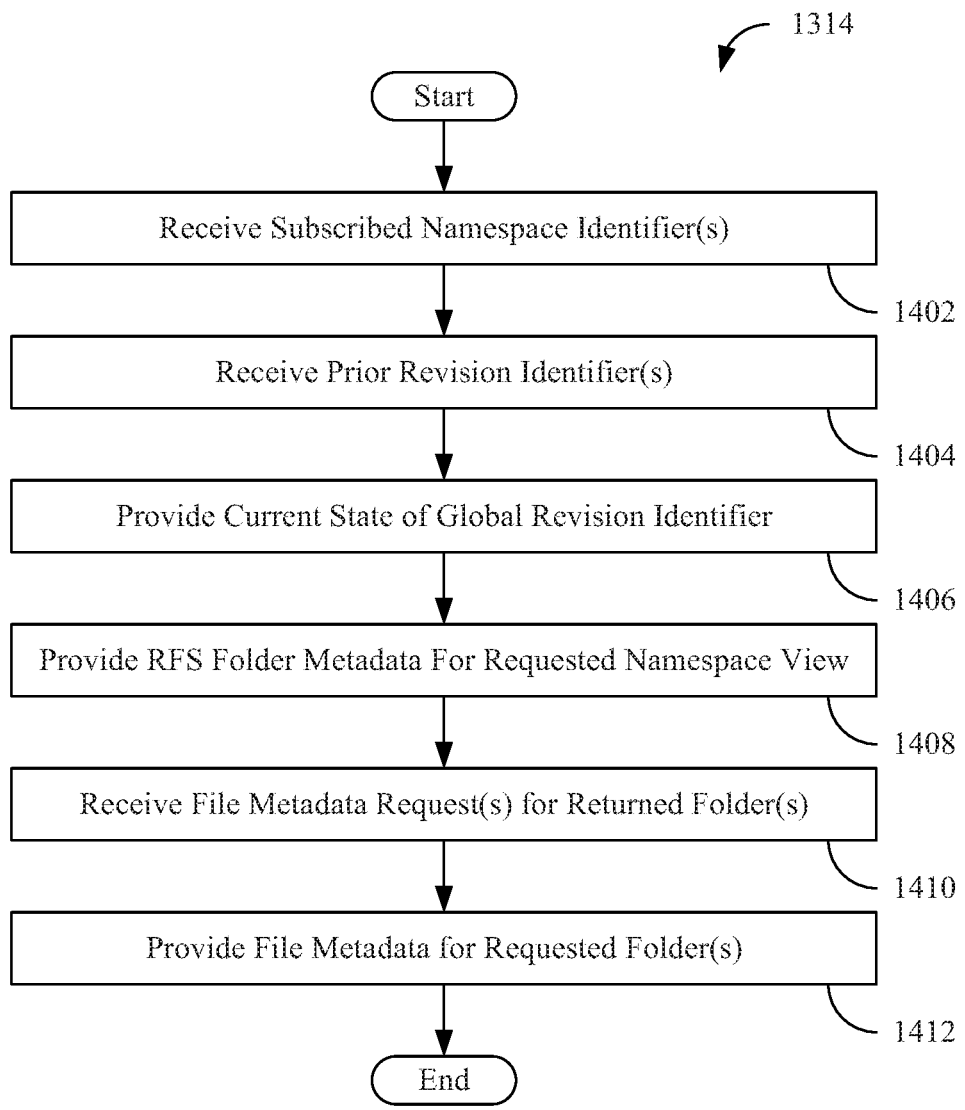
FIG. 14 is a flowchart summarizing one method of performing the seven step of the method of FIG. 13.

FIG. 14 is a flowchart summarizing a method of performing step 1314 (provide RFS metadata) of method 1300. In a first step 1402, remote synchronizer 812 receives one or more subscribed namespace identifiers 312(1-*n*) associated with portion(s) of subscribed namespace 204 from local cloud server 102. Then, in a second step 1404, remote synchronizer 812 receives one or more prior revision identifiers 314(1-*n*) from local cloud server 104 that are associated with the requested subscribed namespace portions. (Second step 1404 is optional as discussed above.) In a third step 1406, remote synchronizer 814 provides the current state of global revision identifier 310 to local cloud server 104. In a fourth step 1408, remote synchronizer 812 searches the portions of RFS 302 corresponding to the namespace view 315 associated with subscribed namespace identifiers 312(1-*n*) and returns folder metadata 316 for each folder contained therein. (In alternative methods, remote synchronizer 812 can provide folder metadata 316 only for folders in the requested namespace view 315 that have a revision identifier (Revision_ID field 416) between an associated prior revision identifier 314 and the current state of global revision identifier 310 (e.g., within a desired window or range).) Then in a fifth step 1410, remote synchronizer 812 receives file metadata request(s) from local cloud server 104 for at least some of the folders returned in folder metadata 316. Accordingly, in a sixth step 1412, remote synchronizer 812 obtains the file metadata 318 (a file listing) for each requested folder of RFS 302 and provides the file metadata 318 to local cloud server 104.

Figure 15:
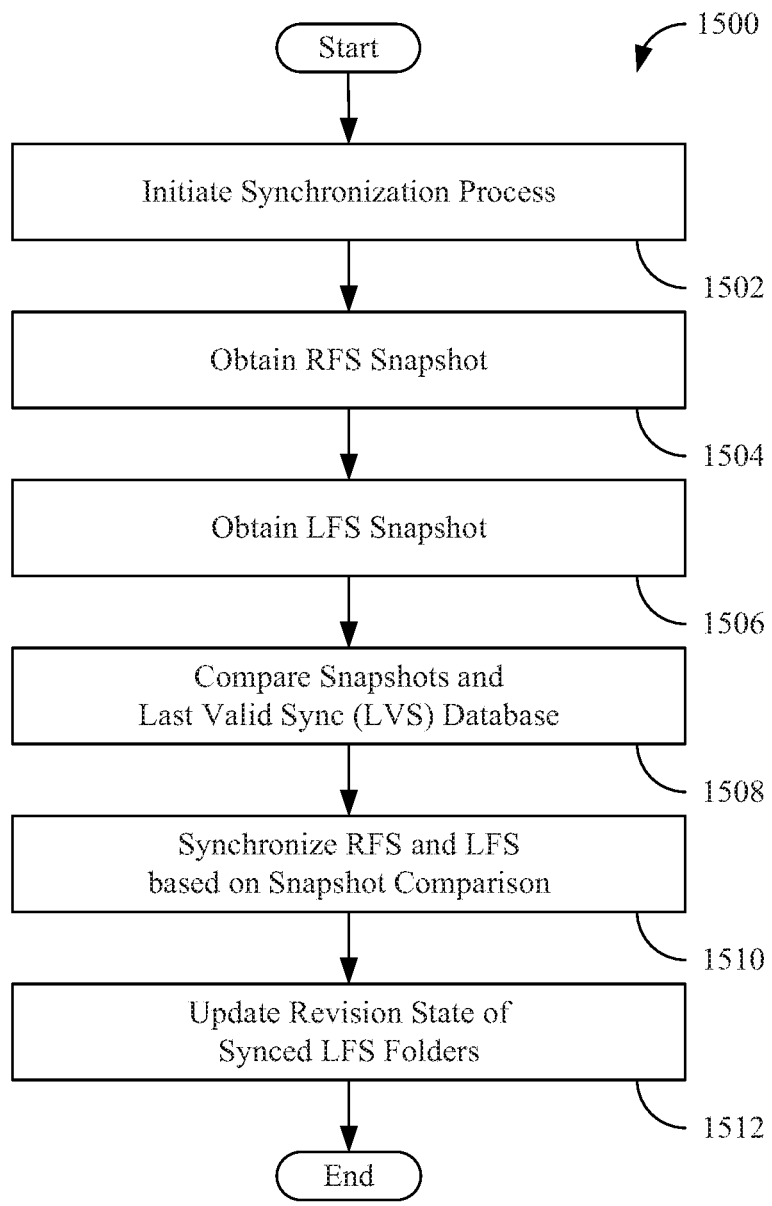
FIG. 15 is a flowchart summarizing one method of synchronizing remote and local file systems according to the present invention.

FIG. 15 is a flowchart summarizing one method 1500 for synchronizing all or some of a subscribed namespace 204 between an RFS 302 and an LFS 306 according to the present invention. In a first step 1502, local synchronizer 1110 of local cloud server 104 initiates a synchronization process with remote synchronizer 812 of remote cloud server 102. In a second step 1504, local synchronizer 1110 obtains an RFS snapshot 320 or limited RFS snapshot 330 of RFS metadata 304 from remote cloud server 102 and stores the RFS snapshot 320 or limited RFS snapshot 330 in LFS 306. Local synchronizer 1110 then obtains an LFS snapshot 322 of LFS metadata 308 and stores the LFS snapshot 322 in LFS 204 in a third step 1506. Then, in a fourth step 1508, local synchronizer 1110 compares the RFS snapshot 320 or limited RFS snapshot 330, the LFS snapshot 322, and data in LVS database 328 (if any exists yet). In a fifth step 1510, local synchronizer 1110 identifies remote and local RS events based on the comparison and causes file system operations to be applied to RFS 302 and LFS 306 to synchronize portions of subscribed namespace 204. In a sixth step 1512, local synchronizer 1110 updates the Prior_Revision_ID field 524 in each folder record 502 of LFS metadata 308 that was synchronized on RFS 302 and LFS 306.

Figure 16:
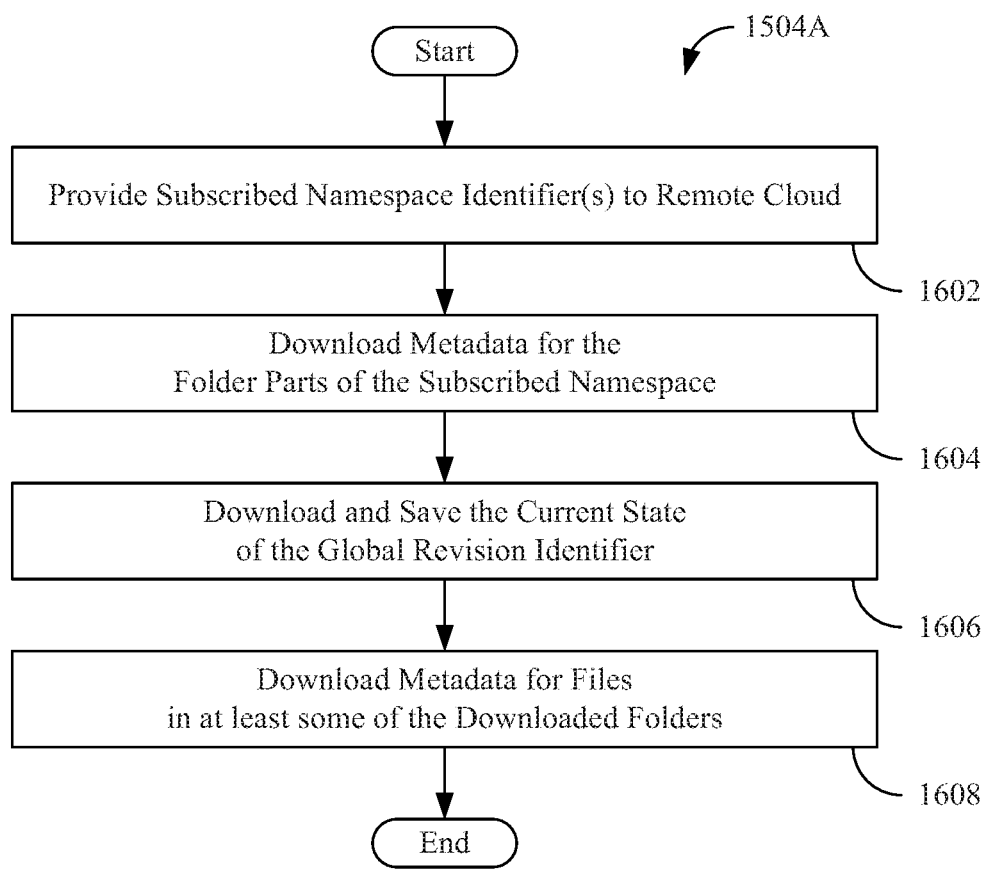
FIG. 16 is a flowchart summarizing a first method of performing the second step of the method of FIG. 15 according to the invention.

FIG. 16 is a flowchart summarizing a first method 1504A of performing the second step (obtain RFS snapshot) of the method 1500 according to the present invention. In a first step 1602, local cloud server 104 provides one or more subscribed namespace identifiers 312(1-*n*) (e.g., the paths for the top-most folders of the requested namespace view 315) to remote cloud server 102. Optionally, local cloud server 104 can also provide one or more prior revision identifier(s) 314 (1-*n*) to remote cloud server 102. Then, in a second step 1604, local cloud server 104 downloads folder metadata 316 (e.g., a list of folder records 402 and their associated revision identifiers 416) associated with each folder in the requested namespace view 315 of the subscribed namespace 204 from remote cloud server 102. Additionally, in a third step 1604, local cloud server 104 downloads and saves the current state of global revision identifier 310 from remote cloud server 102. Then, in a fourth step 1608, local cloud server 104 downloads and saves file metadata 318 (e.g., a list of file records 404) for the files stored in at least some of the folders identified in the returned folder metadata 316.

Figure 17:
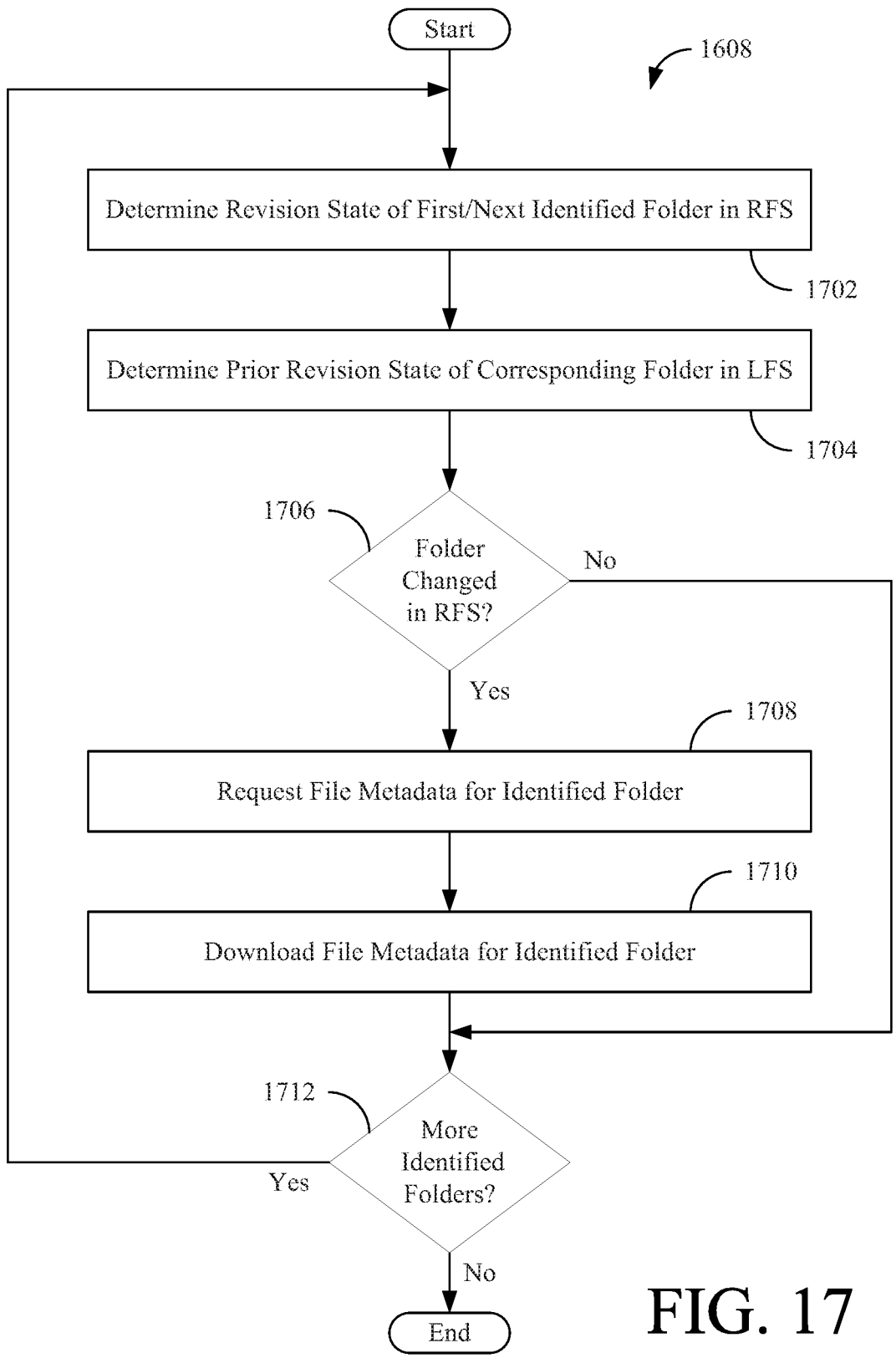
FIG. 17 is a flowchart summarizing a method of performing the fourth step of the method of FIG. 16 according to the invention.

FIG. 17 is a flowchart summarizing a method of performing the fourth step 1608 (download file metadata) of the method 1600 of FIG. 16. In a first step 1702, local synchronizer 1110 determines the revision state of a first folder of RFS 302 that is provided (identified) in the folder metadata 316 received from remote cloud server 102. The revision state corresponds to a state stored in Revision_ID field 416 of the RFS metadata provided as part of the folder metadata 316 for the identified folder. Then, in a second step 1704, local synchronizer 1110 determines the prior revision state of a corresponding folder in LFS 302. The prior revision state corresponds to the state stored in Prior_Revision_ID field 524 for the corresponding folder in the LFS metadata. Then, in a third step 1706, local synchronizer 1110 compares the revision state for the identified folder in RFS 302 with the prior revision state of the corresponding folder in LFS 304 to determine if the folder has changed if the prior revision state for the corresponding folder in LFS 306 is greater than the revision state of the identified folder in RFS 302). If so, local synchronizer 1110 determines that the identified folder has mutated and, in a fourth step 1708, makes a file listing query for the identified folder to remote cloud server 102. Then, in a fifth step 1710, local synchronizer 1110 receives the file metadata 318 for the folder. Thereafter, in a sixth step 1712, local synchronizer 1110 determines if more folders are identified in the folder metadata 316 returned by remote cloud server 102. If so, the method returns to first step 1702. If not, the method ends.

However, if in third step 1706, local synchronizer 1110 determines that the identified folder in RFS 302 has not changed, then the method proceeds to sixth step 1712 without downloading file metadata for the identified folder. In this particular method, local synchronizer 1110 determines that the identified folder has not changed if the revision state of the identified folder in RFS 302 is equal to the prior revision state of the corresponding folder in LFS 306. Accordingly, the metadata retrieved by local cloud server 104 for the requested namespace view is limited, which facilitates the advantages of the invention discussed above.

Figure 18:
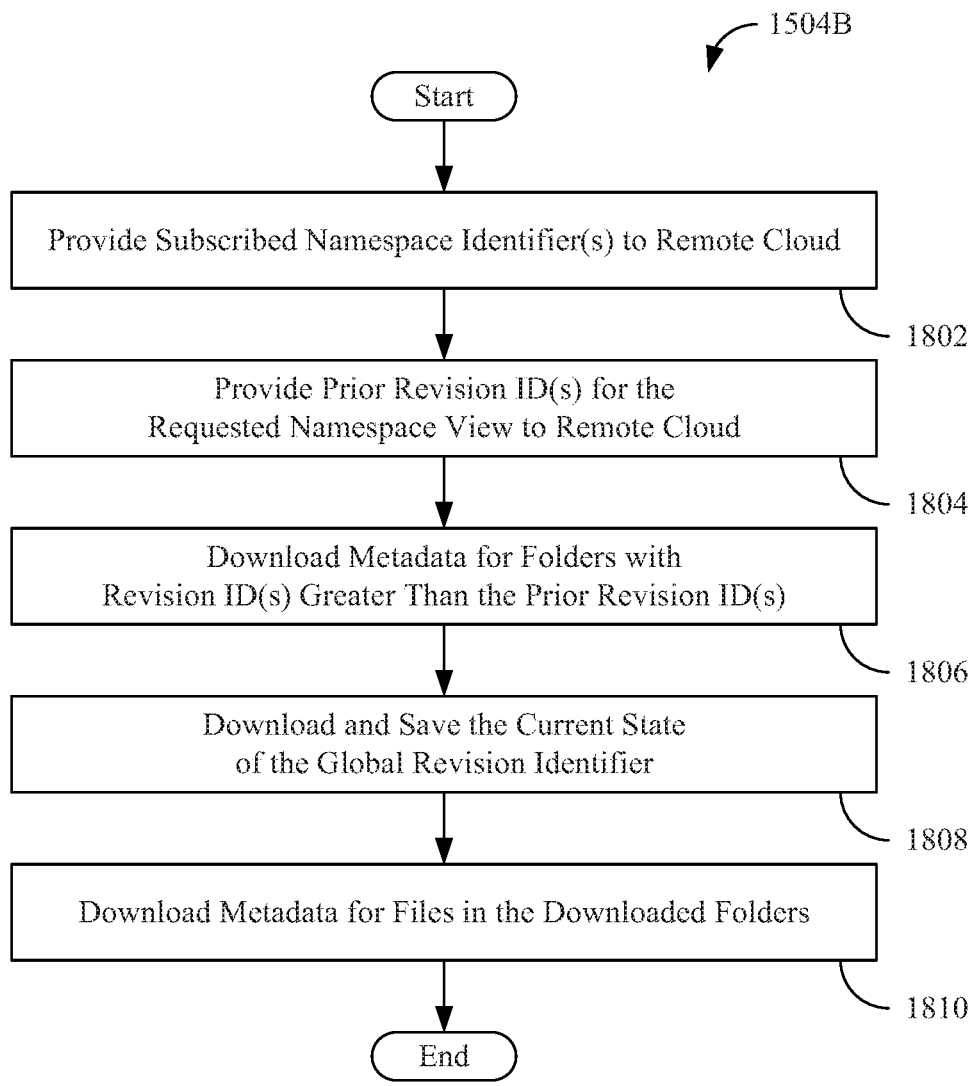
FIG. 18 is a flowchart summarizing an alternative method of performing the second step of the method of FIG. 15 according to the invention.

FIG. 18 is a flowchart summarizing an alternative method 1504B for performing the second step (obtain RFS snapshot) that facilitates the continued resynchronization of subscribed namespace 204 between LFS 306 and RFS 302. In a first step 1802, local cloud server 104 provides one or more subscribed namespace identifier 312(1-*n*) (e.g., paths for the top-most folder(s) of the desired namespace view 315 of subscribed namespace 204) to remote cloud server 102. In a second step 1804 (optionally occurring simultaneously with step 1802), local cloud server 104 provides prior revision identifier(s) 314(1-*n*) for the requested namespace view 315 to remote cloud server 102. The prior revision identifier(s) 314(1-*n*) correspond to the prior revision identifiers stored in Prior_Revision._ID field 524 of the folders 502 identified by the subscribed namespace identifiers 312(1-*n*). Then, in a third step 1806, local cloud server 104 downloads folder metadata 316 (e.g., a list of folder records) from remote cloud server 102 corresponding to each folder that is part of the requested namespace view 315 on RFS 302 that has a revision identifier 416 greater than a corresponding prior revision identifier 314 provided by local cloud server 104 for that part of the namespace. In a fourth step 1808, local cloud server 104 downloads and saves the current state of global revision identifier 310 from remote cloud server 102. In a fifth step 1810, local cloud server 104 downloads and saves file metadata 318 (e.g., a list of file records) for the files contained in at least some (e.g., each) of the folders identified in the folder metadata 316 received in step 1806.

The description of particular embodiments of the present invention is now complete. Many of the described features may be substituted, altered or omitted without departing from the scope of the invention. For example, the folder and file metadata might include additional or fewer fields. As another example, alternative formats of the global revision identifier can be used. These and other deviations from the particular embodiments shown wilt be apparent to those skilled in the art, particularly in view of the foregoing disclosure,

We claim:

1. In a remote multi-client file storage system, a method for facilitating synchronization of each of a plurality of remote file systems (RFSs) with particular, associated ones of a plurality of local file systems (LFSs), said RFSs being located geographically remotely from said LFSs, said method comprising:

maintaining a first global revision identifier associated with a first RFS of said plurality of said RFSs, said first global revision identifier being a data variable having a value that is updated responsive to a file system operation being performed on any of a plurality of different file system objects associated with said first RFS, but not on a file system object associated with a second RFS of said plurality of RFSs;

maintaining a second global revision identifier associated with said second RFS, said second global revision identifier being a data variable having a value that is updated responsive to a file system operation being performed on any of a plurality of different file system objects associated with said second RFS, but not on a file system object associated with said first RFS;

receiving from a first local file storage system storing a first one of said LFSs a prior value of said first global revision identifier associated with the occurrence of a prior synchronization of said file system objects of said first RFS with file system objects of said first one of said LFSs associated with said first RFS, at least a portion of said file system objects of said first one of said LFSs having been locally altered since said prior synchronization of said file system objects of said first RFS with file system objects of said first one of said LFSs;

receiving from a second local file storage system storing a second one of said LFSs a prior value of said second global revision identifier associated with the occurrence of a prior synchronization of said file system objects of said second RFS with file system objects of said second one of said LFSs associated with said second RFS, at least a portion of said file system objects of said second one of said LFSs having been locally altered since said prior synchronization of said file system objects of said second RFS with file system objects of said second one of said LFSs;

establishing a network connection over a wide area network with a first user associated with said first RFS and said first global revision identifier;

providing access to said first RFS to said first user, said first RFS including said plurality of file system objects associated with said first RFS, each of said file system objects associated with said first RFS being associated with first metadata;

receiving an instruction to modify a particular file system object of said plurality of file system objects of said first RFS from said first user;

responsive to said particular file system object of said first RFS being modified, updating a first portion of said first metadata associated with said particular file system object of said first RFS based on a current value of said first global revision identifier and not said second global revision identifier;

receiving an instruction to modify a different file system object of said plurality of file system objects of said first RFS from said first user or another user associated with said first RFS;

responsive to said different file system object of said first RFS being modified, updating a second portion of said first metadata associated with said different file system object of said first RFS based on an updated value of said first global revision identifier;

comparing said first metadata of said file system objects of said first RFS with said prior value of said first global revision identifier received from said first local file storage system to identify file system objects of said first RFS that have not yet been synchronized with said file system objects of said first LFS;

comparing second metadata associated with said file system objects of said second RFS with said prior value of said second global revision identifier received from said second local file storage system to identify file system objects of said second RFS that have not yet been synchronized with said file system objects of said second LFS;

responsive to receiving said prior value of said first global revision identifier providing to said first local file storage system only metadata corresponding to said identified file system objects of said first RFS that have not yet been synchronized and not metadata corresponding to file system objects of said first RFS that have been synchronized in order to facilitate synchronization of said first RFS with said first LFS; and responsive to receiving said prior value of said second global revision identifier providing to said second local file storage system only metadata corresponding to said identified file system objects of said second RFS that have not yet been synchronized and not metadata corresponding to file system objects of said second RFS that have been synchronized in order to facilitate synchronization of said second RFS with said second LFS.

2. The method of claim 1, wherein said step of updating said first portion of said first metadata includes altering said first portion of said first metadata associated with said particular file system object to reflect said value of said first global revision identifier.

3. The method of claim 2, further comprising updating said value of said first global revision identifier to said current value prior to said step of updating said first portion of said first metadata associated with said particular file system object of said RFS based on said current value of said first global revision identifier.

4. The method of claim 1, wherein said step of updating said first portion of said first metadata associated with said particular file system object includes updating metadata associated with one or more folders of said first RFS.

5. The method of claim 4, wherein said instruction to modify a particular file system object of said plurality of file system objects of said first RFS comprises an instruction involving a file located within said one or more of said folders having said metadata associated therewith updated.

6. The method of claim 1, wherein:
said first metadata associated with said plurality of file system objects associated with said first RFS is partitioned into a folders portion and a files portion;
said folders portion includes a plurality of folder records each storing folder metadata associated with a folder of said first RFS;
said files portion includes a plurality of file records each storing file metadata associated with a file of said first RFS;
said folder metadata for each of said folder records includes revision data indicative of said value of said global revision identifier at some point in time; and
said step of updating said first metadata associated with said plurality of file system objects associated with said first RFS based on said current value of said first global revision identifier includes updating said revision data of said folders portion of said first metadata.

7. The method of claim 1, further comprising
receiving along with said prior value of said first global revision identifier a synchronization request from said first local file storage system.

8. The method of claim 7, wherein:
said synchronization request includes data indicative of at least one requested folder within said first RFS; and
said step of providing only metadata corresponding to identified file system objects of said first RFS that have not yet been synchronized includes providing folder metadata associated with one or more identified folders of said first RFS based on said at least one requested folder of said first RFS, said folder metadata including revision data indicative of a value of said first global revision identifier the last time an identified folder of said first RFS was modified.

9. The method of claim 8, further comprising:
receiving a file listing request from said first local file storage system for at least some of said one or more folders identified by said folder metadata provided to said local file storage system; and
providing file metadata for files stored in each folder identified in said file listing request to said local file storage system.

10. The method of claim 7, further comprising providing said current value of said first global revision identifier to said first local file storage system.

11. A remote multi-client file storage system comprising:
memory for storing code and data, said code and data including
a set of predefined instructions for causing at least one hardware processor to perform associated predefined operations,
a first remote file system (RFS) associated with a first local file system (LFS) stored on a first local file storage system located geographically remotely from said first RFS, said first RFS including a first plurality of file system objects, each file system object of said first plurality of file system objects being associated with first metadata,
a second RFS associated with a second LFS stored on a second local file storage system located geographically remotely from said second RFS, said second RFS including a second plurality of file system objects, each file system object of said second plurality of file system objects being associated with second metadata,
a first global revision identifier associated with said first RFS, said first global revision identifier being a data variable having a value that is updated responsive to a file system operation being performed on any of said first plurality of file system objects, but not one of said second plurality of file system objects,
a second global revision identifier associated with said second RFS, said second global revision identifier being a data variable having a value that is updated responsive to a file system operation being performed on any of said second plurality of file system objects, but not on any of said first plurality of file system objects,
a prior value of said first global revision identifier received from said first local file storage system being associated with the occurrence of a prior synchronization of said first plurality of file system objects of said first RFS with associated file system objects of said first LFS, at least a portion of said file system objects of said first LFS having been locally altered since said prior synchronization, and
a prior value of said second global revision identifier received from said second local file storage system being associated with the occurrence of a prior synchronization of said second plurality of file system objects of said second RFS with associated file system objects of said second LFS, at least a portion of said file system objects of said first LFS having been locally altered since said prior synchronization;
a user interface operative to
establish a network connection with a first user associated with said first RFS and said first global revision identifier over a wide area network (WAN),
establish a network connection with another user associated with said first RFS and said first global revision identifier over said WAN,
provide access to said first RFS to said first user and said other user,
receive an instruction to modify a particular file system object of said first plurality of file system objects of said first RFS from said first user, and
receive an instruction to modify a different file system object of said first plurality of file system objects of said first RFS from said first user or said other user;
an RFS updater including a subset of said set of predefined instructions configured to
update a first portion of said first metadata associated with said particular file system object based on a current value of said first global revision identifier and not said second global revision identifier responsive to said particular file system object of said first plurality of file system objects of said first RFS being modified,
update a second portion of said first metadata associated with said different file system object based on an updated value of said first global revision identifier and not said second global revision identifier responsive to said different file system object of said first plurality of file system objects of said first RFS being, modified; and
a remote synchronizer including a second subset of said set of predefined instructions configured to
compare said first metadata of said first plurality of file system objects of said first RFS with said prior value of said first global revision identifier received from said first local file storage system to identify file system objects of said first RFS that have not yet been synchronized with said associated file system objects of said first LFS,
compare said second metadata of said second plurality of file system objects of said second RFS with said prior value of said second global revision identifier received from said second local file storage system to identify file system objects of said second RFS that have not yet been synchronized with said associated file system objects of said second LFS,
responsive to receiving said prior value of said first global revision identifier provide to said first local file storage system only metadata corresponding to said identified file system objects of said first RFS that have not yet been synchronized and not metadata corresponding to file system objects of said first RFS that have been synchronized in order to facilitate synchronization of said first RFS with said first LFS, and
responsive to receiving said prior value of said second global revision identifier provide to said second local file storage system only metadata corresponding to said identified file system objects of said second RFS that have not yet been synchronized and not metadata corresponding to file system objects of said second RFS that have been synchronized in order to facilitate synchronization of said second RFS with said second LFS.

12. The system of claim 11, wherein said RFS updater is configured to alter said first portion of said first metadata associated with said particular file system object to reflect said value of said first global revision identifier.

13. The system of claim 12, wherein said RFS updater is configured to update said value of said first global revision identifier to said current value prior to updating said first portion of said first metadata based on said current value of said first global revision identifier.

14. The system of claim 11, wherein said RFS updater is configured to update metadata associated with one or more folders of said first RFS responsive to said first RFS being modified by said first user or said other user.

15. The system of claim 14, wherein said updated metadata associated with one or more folders of said first RFS is associated with a folder containing a file therein, said file receiving at least a portion of said modification to said particular file system object of said first plurality of file system objects of said first RFS by said first user or said other user.

16. The system of claim 11, wherein:
said first metadata associated with said first plurality of file system objects associated with said first RFS is partitioned into a folders portion and a files portion;
said folders portion includes a plurality of folder records each storing folder metadata associated with a folder of said first RFS;
said files portion includes a plurality of file records each storing file metadata associated with a file of said first RFS;
said folder metadata includes revision data indicative of said value of said global revision identifier at some point in time; and
said RFS updater is configured to update said revision data of said folder metadata responsive to said first RFS being modified by said first user or said other user.

17. The system of claim 11, wherein,
said remote synchronizer is configured to receive along with said prior value of said first global revision identifier a synchronization request from said first local file storage system.

18. The system of claim 17, wherein:
said synchronization request includes data indicative of at least one requested folder within said first RFS; and
said remote synchronizer is configured to provide folder metadata associated with one or more identified folders of said first RFS based on said at least one requested folder of said first RFS to said first local file storage system, said folder metadata including revision data indicative of a value of said first global revision identifier the last time an identified folder of said first RFS was modified.

19. The system of claim 18, wherein:
said client interface is operative to receive a file listing request from said first local file storage system for at least some of said one or more folders associated with said folder metadata provided to said first local file storage system; and
said remote synchronizer is further configured to provide file metadata for files stored in each folder identified in said file listing request to said first local file storage system.

20. The system of claim 17, wherein said remote synchronizer is configured to provide said current value of said first global revision identifier to said first local file storage system.

21. A remote multi-client file storage system comprising:
memory for storing code and data, said code and data including
a set of predefined instructions for causing at least one hardware processor to perform associated predefined operations,
a first remote file system (RFS) associated with a first local file system (LFS) stored on a first local file storage system located geographically remotely from said remote multi-client file storage system, said first RFS including a first plurality of file system objects, each file system object of said first plurality of file system objects being associated with first metadata,
a second RFS associated with a second LFS stored on a second local file storage system located geographically remotely from said remote multi-client file storage system, said second RFS including a second plurality of file system objects, each file system object of said second plurality of file system objects being associated with second metadata,
a prior value of a revision state of said first RFS received from said first local file storage system that is associated with the occurrence of a prior synchronization of said first plurality of file system objects of said first RFS with associated file system objects of said first LFS, at least a portion of said file system objects of said first LFS having been locally altered since said prior synchronization of said first plurality of file system objects of said first RFS with associated file system objects of said first LFS,
a prior value of a revision state of said second RFS received from said second local file storage system that is associated with the occurrence of a prior synchronization of said second plurality of file system objects of said second RFS with associated file system objects of said second LFS, at least a portion of said file system objects of said second LFS having been locally altered since said prior synchronization of said second plurality of file system objects of said second RFS with associated file system objects of said second LFS;
means for tracking said revision state of said first RFS, said revision state being updated when a file system operation is performed on any of said first plurality of file system objects, but not on any of said second plurality of file system objects;
a user interface operative to
establish a network connection with a first user associated with said first RFS over a wide area network (WAN),
establish a network connection with another user associated with said first RFS over said WAN,
provide access to said first RFS to said first user and said other user,
receive an instruction to modify a particular file system object of said first plurality of file system objects of said first RFS from said first user, and
receive an instruction to modify a different file system object of said first plurality of file system objects of said first RFS from said first user or said other user; and
means for updating said first metadata associated with said first plurality of file system objects based on said revision state of said first RFS but not said revision state of said second RFS responsive to said particular file system object and said different file system object of said first plurality of file system objects of said first RFS being modified by said first user or said other user; and a synchronizer including a subset of said predefined instructions configured to compare said first metadata of said first plurality of file system objects of said first RFS with said prior value of said revision state of said first RFS to identify file system objects of said first RFS that have not yet been synchronized with associated file system objects of said first LFS, compare said second metadata of said second plurality of file system objects of said second RFS with said prior value of said revision state of said second RFS received from said first local file storage system to identify file system objects of said second RFS that have not yet been synchronized with associated file system objects of said second LFS, responsive to receiving said prior value of said revision state of said first RFS provide to said first local file storage system only metadata corresponding to said identified file system objects of said first RFS that have not yet been synchronized and not metadata corresponding to file system objects of said first RFS that have been synchronized in order to facilitate synchronization of said first RFS with said first LFS, and responsive to receiving said prior value of said revision state of said second RFS provide to said second local file storage system only metadata corresponding to said identified file system objects of said second RFS that have not yet been synchronized and not metadata corresponding to file system objects of said second RFS that have been synchronized in order to facilitate synchronization of said second RFS with said second LFS.

22. A method for synchronizing a local file system (LFS) with an associated remote file system (RFS), said LFS being stored on a local file storage system located geographically remotely from said associated RFS, said method comprising:

establishing a network connection with a geographically remote multi-client file storage system having a plurality of RFSs each associated with one of a plurality of clients stored thereon, said plurality of RFSs including said associated RFS;

initiating a synchronization process with said remote multi-client file storage system;

providing at least one namespace identifier to said remote multi-client file storage system via said network connection, said namespace identifier being indicative of at least a portion of a subscribed namespace synchronized on said associated RFS and said LFS, but not others of said plurality of RFSs; and providing at least one prior revision identifier to said remote multi-client file storage system, said prior revision identifier being associated with said associated RFS and the occurrence of a prior synchronization of said at least said portion of said subscribed namespace between said associated RFS and said LFS;

receiving RFS metadata from said remote multi-client file storage system, said RFS metadata being associated with file system objects in said at least said portion of said subscribed namespace that have been modified since said prior synchronization;

generating file system operations based at least in part on said received RFS metadata;

providing at least a first portion of said file system operations to said remote multi-client file storage system; and applying at least a second portion of said file system operations to said LFS; and wherein said RFS and said LFS are synchronized when said portion of said file system operations is applied to said RFS and said second portion of said file system operations is applied to said LFS; and said prior revision identifier is a particular value of a data variable at a time of said prior synchronization, said data variable being updated when a file system operation is performed on any of a plurality of file system objects of said at least said portion of said subscribed namespace on said RFS.

23. The method of claim 22, wherein:

said RFS metadata comprises folder metadata associated with one or more folders of said subscribed namespace; and said method further comprises querying said remote multi-client file storage system for file metadata associated with files stored in at least some of said one or more folders.

24. The method of claim 22, further comprising:

receiving a current revision identifier from said remote multi-client file storage system, said current revision identifier defining a current state associated with said associated RFS; and storing said current revision identifier in LFS metadata associated with at least one folder of said at least said portion of said subscribed namespace on said LFS associated with said namespace identifier.

25. A local file storage system storing a local file system (LFS) that is synchronized with an associated remote file system (RFS) stored geographically remotely from said LFS, said local file storage system comprising:

memory for storing data and code, said data and code including a set of predefined instructions for causing at least one hardware processor to perform associated predefined operations, said LFS including a plurality of file system objects, each of said file system objects being associated with LFS metadata, and a plurality of prior revision identifiers, each prior revision identifier being associated with said associated RFS and the occurrence of a prior synchronization of at least an associated folder of a subscribed namespace between said LFS and said associated RFS;

a remote cloud interface configured to establish a wide area network connection with said remote multi-client file storage system, said remote file storage system having a plurality of RFSs stored thereon, each RFS of said plurality of RFSs being associated with one of a plurality of different clients, said plurality of RFSs including said associated RFS; and a synchronizer including a subset of said predefined instructions configured to initiate a synchronization process with said remote multi-tenant file storage system, provide at least one namespace identifier to said remote multi-tenant file storage system via said wide area network connection, said namespace identifier being indicative of at least a portion of said subscribed namespace, said subscribed namespace being synchronized on said LFS and said associated RFS, but not other of said RFSs, provide at least one prior revision identifier associated with said namespace identifier to said remote multi-client file storage system, receive RFS metadata from said remote multi-client file storage system, said RFS metadata being associated with file system objects in said at least said portion of said subscribed namespace that have been modified since said prior synchronization, generate file system operations based at least in part on said received RFS metadata, provide at least a first portion of said file system operations to said remote multi-client file storage system, and apply at least a second portion of said file system operations to said LFS; and wherein said RFS and said LFS are synchronized when said portion of said file system operations is applied to said RFS and said second portion of said file system operations is applied to said LFS; and said prior revision identifier is a particular value of a data variable at a time of said prior synchronization, said data variable being updated when a file system operation is performed on any of a plurality of file system objects of said at least said portion of said subscribed namespace on said RFS.

26. The system of claim 25, wherein:

said RFS metadata comprises folder metadata associated with one or more folders of said subscribed namespace; and said synchronizer is configured to query said remote multi-client file storage system for file metadata associated with files stored in at least some of said one or more folders.

27. The system of claim 25, wherein:

said remote cloud interface is configured to receive a current revision identifier from said remote multi-client file storage system, said current revision identifier defining a current state associated with said associated RFS; and said synchronizer is configured to store said current revision identifier in LFS metadata associated with at least one folder of said at least said portion of said subscribed namespace on said LFS associated with said namespace identifier.

* * * * *